Jan. 31, 1961 F. W. VIEHE 2,970,291

ELECTRONIC RELAY CIRCUIT

Original Filed May 29, 1947

5 Sheets-Sheet 1

INVENTOR.
Frederick W. Viehe
BY Reed C. Lawlor
ATTORNEY

Jan. 31, 1961 F. W. VIEHE 2,970,291

ELECTRONIC RELAY CIRCUIT

Original Filed May 29, 1947

5 Sheets-Sheet 2

INVENTOR.
Frederick W. Viehe
BY Reed C. Lawlor
ATTORNEY

INVENTOR.
Frederick W. Viehe
BY
Reed C. Lawlor
ATTORNEY

Jan. 31, 1961

F. W. VIEHE 2,970,291

ELECTRONIC RELAY CIRCUIT

Original Filed May 29, 1947

5 Sheets-Sheet 4

INVENTOR.
Frederick W. Viehe
BY
Reed C. Lawlor
ATTORNEY

INVENTOR.
Frederick W. Viehe
BY
Reed C. Lawlor
ATTORNEY

United States Patent Office 2,970,291

Patented Jan. 31, 1961

2,970,291

ELECTRONIC RELAY CIRCUIT

Frederick W. Viehe, Los Angeles, Calif., assignor to International Business Machines Corporation, New York, N.Y., a corporation of New York Continuation of application Ser. No. 232,525, June 20, 1951, which is a continuation of application Ser. No. 751,422, May 29, 1947. This application June 28, 1954, Ser. No. 439,579

107 Claims. (Cl. 340—172.5)

My invention relates to electric circuits employing relays and more particularly to electronic relay circuits and to memory systems for such circuits. This application is a continuation of my prior application Serial No. 232,525, filed June 20, 1951, which application was a continuation of my previous prior application Serial No. 751,422, filed May 29, 1947. Applications Serial No. 232,525 and Serial No. 751,422 are now abandoned.

In many electrical systems, electric discharge devices, whether they be of the vacuum type or of the gaseous discharge type, are used as relays for a wide variety of control purposes. For example, such relays are used in accumulator circuits or transfer circuits of calculating machines. Such relays are also used in sequence-timing circuits for controlling various manufacturing operations. In addition, they are used for generating pulses in predetermined relationship in intelligence transmission systems, such as television and teletyperwriter systems, or the like. In many other applications, such relay means are used to control the application of large quantities of electrical power. Instances of such applications include inverters and welding machines.

The electric discharge devices used in such electric circuits are adapted to be operated and restored while energized and the devices are always either normally operated or restored while de-energized. Suitable means are provided in such circuits for changing each electric discharge device from its operated condition to its restored condition, and vice versa, while the electric discharge device is suitably energized; and suitable means are also provided for energizing and de-energizing the circuits. In the conventional electronic relay circuit, if the circuit becomes de-energized for any reason whatever, information regarding the last previous condition of each of the relays prior to de-energization is lost forever, or, at least, cannot be ascertained without great difficulty. After re-energization of such systems, the subsequent operation and restoration of the various relays therein bears no predetermined or controlled relationship to the last set of conditions existing prior to de-energization. This means, for example, that in the case of a calculating machine, the solution of a problem which has been interrupted by de-energization of the calculating machine must be commenced anew when the calculating machine is re-energized. It also means that in many other cases, a deviation from the normal sequential operation is likely to occur after the sequence is interrupted by de-energization of the relay circuit, resulting in poor work or other undesirable effects.

Accordingly, it is a general object of my invention to provide an electronic relay circuit with a memory system which permits remembering the last prior condition of the respective relay means therein after the relay circuit is de-energized for any reason without resorting to mechanical means.

Another general object of my invention is to provide an electronic relay circuit with means for recalling the last prior condition of the respective relay means therein when the circuit is re-energized.

Another object of my invention is to provide a system for de-energizing various cascaded stages of an electronic calculating machine whereby the last prior condition of the respective sections thereof is remembered.

Another object of my invention is to provide a system for re-energizing various cascaded sections of an electronic calculating machine in such a way as to permit the recall of the last prior condition of the respective sections therein.

Another object of my invention is to provide an improved means for coordinately operating and restoring various inter-connected sections of an electronic relay circuit.

Another object of my invention is to provide an improved means for establishing a predetermined set of conditions in the various sections of an electronic relay circuit.

Another object of my invention is to provide an improved means for changing the condition, either operated or restored, of a relay means according to the prior history of the circuit in which it is arranged.

Another object of my invention is to provide an improved means for zeroing an electronic calculator.

Another object of my invention is to provide an improved means for transferring counts from one stage of an electronic calculator to another stage therein.

Another object of my invention is to provide a control circuit including relay means associated with an electronic relay system having memory means therein, which control circuit is adapted for de-energizing and re-energizing said system automatically to facilitate recall of the last condition thereof prior to de-energization.

Another object of my invention is to provide an electronic relay circuit with improved actuating means.

Another object of my invention is to provide an improved electronic trigger circuit.

A further object of my invention is to provide a magnetic device which is adapted to be magnetized according to the last prior condition of an electronic relay circuit in which it is arranged when that circuit is de-energized.

A further object of my invention is to provide a magnetic device which is adapted to facilitate recall of the last prior condition of an electronic relay circuit in which it is arranged when that circuit is re-energized.

A further object of my invention is to provide a transformer utilizing a core composed of a material having appreciable magnetic retentivity for operating or restoring a trigger circuit in which the transformer is arranged, according to the prior history of the core.

A still further object of my invention is to provide an electronic relay circuit of the ring type with an improved means for sequentially operating various sections of the ring.

A still further object of my invention is to provide an improved pulse standardizing circuit.

A still further object of my invention is to provide means for automatically actuating an electronic relay circuit after it has been re-energized in such a way as to recall its last condition prior to de-energization.

And a still further object of my invention is to provide means for energizing and de-energizing an electronic relay circuit without inadvertently actuating any of the sections thereof.

While the principles involved in my invention may be applied to various types of electronic control circuits, for the purpose of illustration they will be described hereinbelow with particular reference to their application to an electronic counter, and with particular reference to counters utilizing electric discharge devices as relay means. However, it is to be understood that these principles may also be applied to other types of electronic relay circuits and to other types of relay means so that the disclosure of the specific application of these principles to electronic counters is not to be considered a limitation of the invention thereto. Accordingly, other objects of my invention, together with numerous advantages thereof, and also other applications of my invention to other types of electronic relay circuits, will become apparent in the course of the following detailed description of the invention as applied to electronic counters.

Referring to the accompanying drawings.

Figure 1:
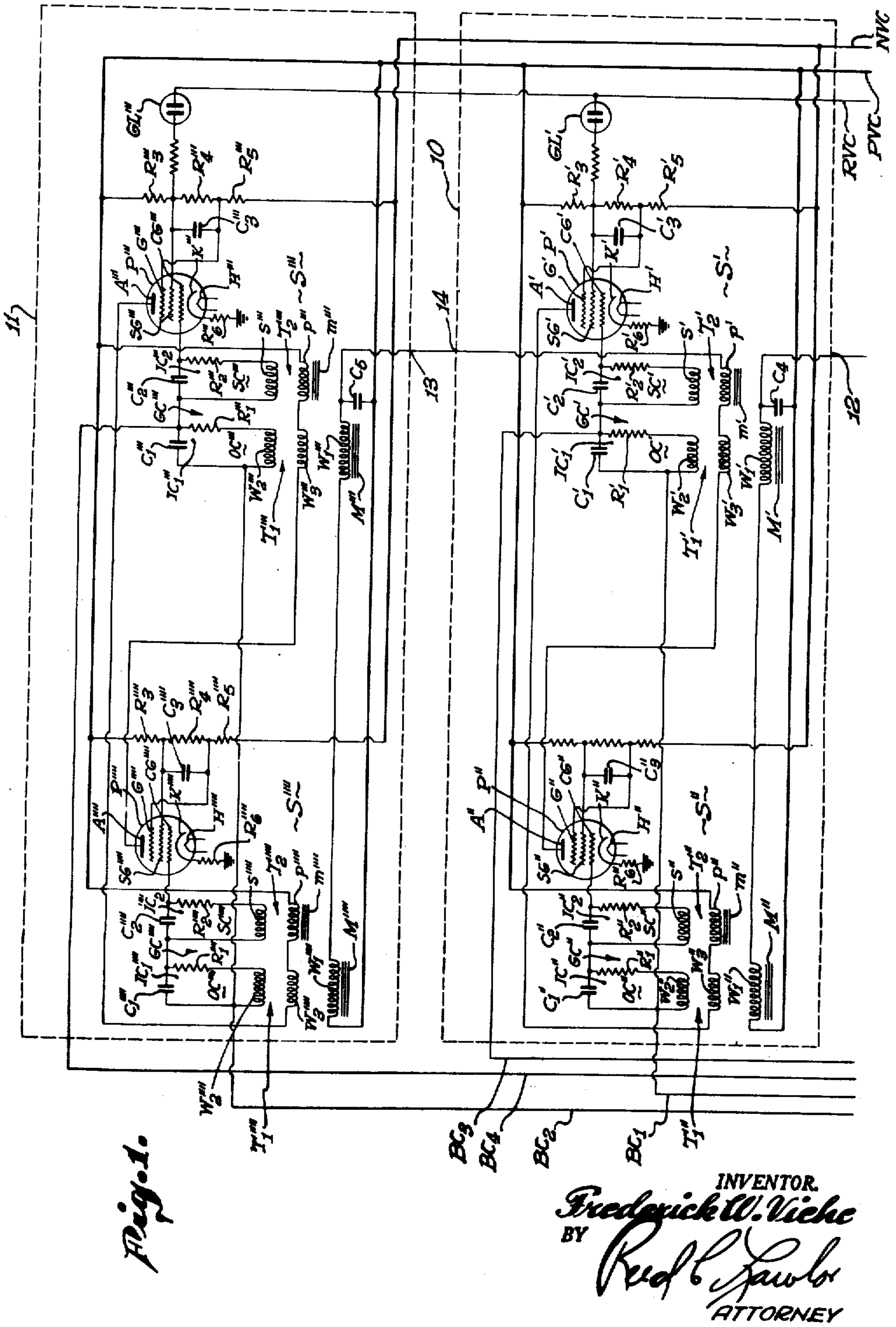
Fig. 1 is a wiring diagram of a two-stage scale-of-four electronic counter incorporating features of my invention.
Figure 2:
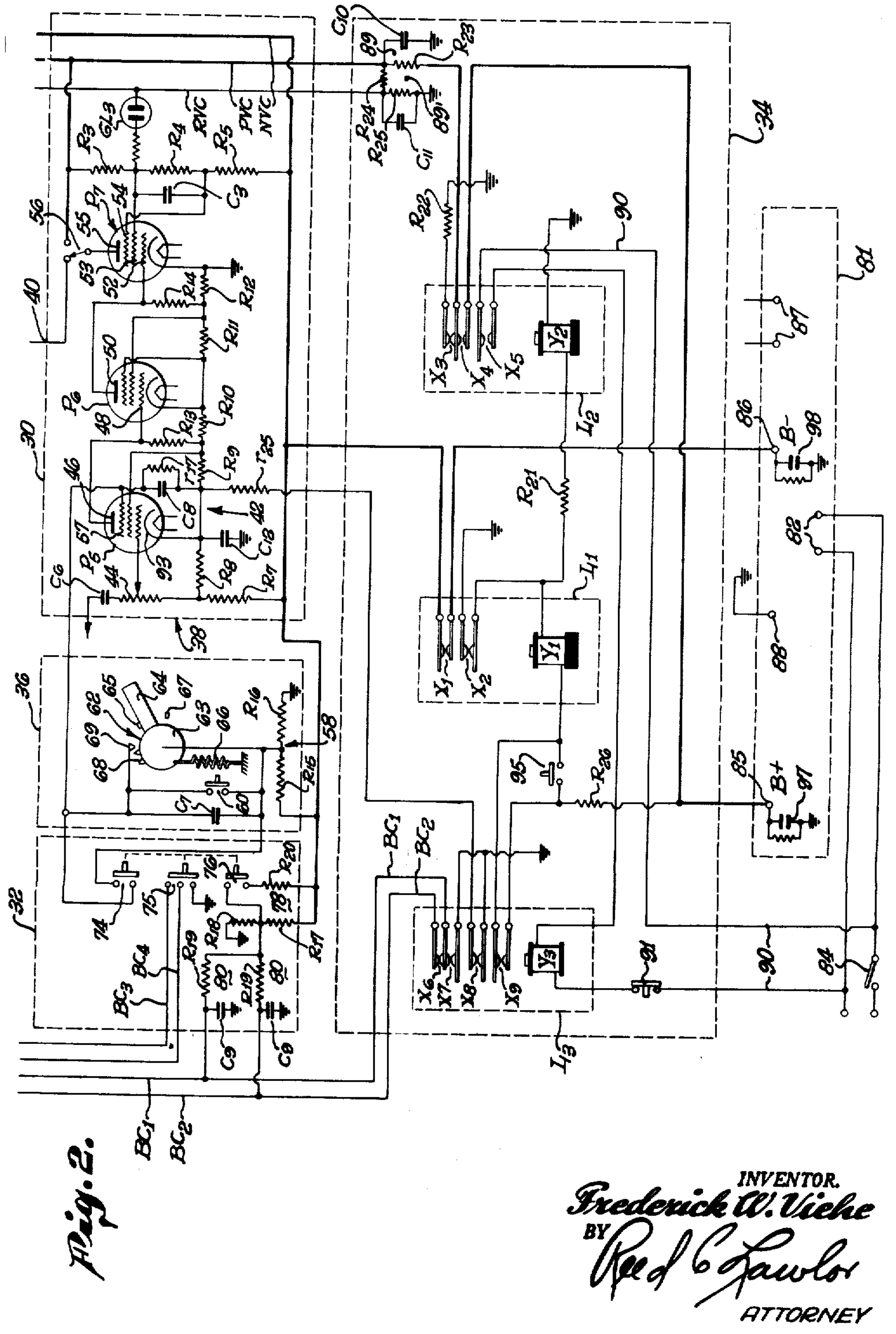
Fig. 2 is a wiring diagram of auxiliary circuits associated with the electronic counter of Fig. 1.

Referring to the drawings and more particularly to Figs. 1 and 2, there is illustrated an electrical counter embodying features of my invention and comprising two scale-of-two counting stages 10 and 11 connected in cascade and provided with memory elements and suitable control circuits by means of which an indicated count may be remembered and recalled in the event that the counter becomes de-energized.

*Construction of counter*

Each of the counting stages comprises two sections which are arranged to be alternatively operated and restored, the first stage 10 including first and second sections S′ and S″, and the second stage 11 comprising third and fourth sections S‴ and S″″. For convenience, similar elements in the four sections are indicated in the following description by the same legend such as a letter but each carries a different superscript ′, ″, ‴, or ″″ to indicate whether it is in the first, second, third or fourth section respectively, and wherever the description applies to any such element in all sections, the legend is given without a superscript.

Each of the sections includes relay means in the form of an electric discharge device. Preferably these devices are negative-transconductance pentodes P. Each of the pentodes P comprises five electrodes, namely, a cathode K, a control grid CG, a screen grid SG, a suppressor grid G, and an anode A. Suitable electrode potential supply circuits are associated with the various electrodes in order to maintain each pentode P stably operated in a relatively conducting condition or stably restored in a relatively non-conducting condition, reference here being made to conduction or non-conduction of current to the anode A. Each pentode P is operated as a negative transconductance tube so that an increase in bias from its normal value by application of a negative pulse thereto renders the pentode conductive (i.e., operated) and a decrease in bias from its normal value by application of a positive pulse thereto renders it non-conductive (i.e., restored).

A grid circuit GC is associated with the control electrode CG of each pentode P, each such grid circuit GC including two grid control circuits. One of the grid control circuits OC is an operating circuit designed to increase the normal bias on the control electrode CG of the associated pentode P so as to change this pentode from a restored condition to an operated condition when the operating circuit is suitably actuated. The other grid control circuit SC is a restoring circuit and serves to reduce the normal bias on the control electrode CG of the associated pentode P so as to change this pentode from an operated condition to a restored condition when the restoring circuit is suitably actuated.

Each of the operating circuits OC includes a magnetic element M in the form of a core composed of a material having appreciable magnetic retentivity, which serves to prepare the operating circuit for operation at the time that the associated pentode P is restored. By virtue of its magnetic retentivity each of the magnetic elements M also serves to remember whether the section in which it is located was last restored or operated, as the case may be. This feature is particularly useful if the counting circuit is de-energized for any reason. In such a case, by virtue of the memory function of these magnetic elements, it is possible to recall the previous conditions of the various sections of the counting circuit after the counting circuit is re-energized, regardless of the time elapsed since it was de-energized. Each of the magnetic elements M constitutes a core of an operating transformer $T_1$ provided with three windings, namely a primary transformer winding $W_1$, secondary transformer winding $W_2$, and a tertiary, or auxiliary, transformer winding $W_3$.

Each of the restoring circuits SC includes a two-winding restoring transformer $T_2$ including a magnetic core *m* upon which are wound a primary winding *p* and a secondary winding *s*.

A first integrating circuit $IC_1$ including a first condenser $C_1$ and a first resistor $R_1$ is connected in each of the operating circuits OC across the secondary winding $W_2$ of the corresponding operating transformer $T_1$. A second integrating circuit $IC_2$ including a second condenser $C_2$ and a second resistor $R_2$ is likewise connected in each restoring circuit SC, across the secondary winding *s* of the restoring transformer $T_2$ in this circuit. The two integrating condensers $C_1$ and $C_2$ in each section S′ and S″ of the first stage 10 are connected in series between the control electrode CG in each of these sections and a first biasing conductor $BC_1$. Similarly the two integrating condensers $C_1$ and $C_2$ in each section S‴ and S″″ of the second stage 11 are connected in series between the control electrode CG in each of these sections and a second biasing conductor $BC_2$. With these arrangements suitable normal bias voltages are supplied to the control electrodes CG in each of the sections from the corresponding biasing conductor $BC_1$ or $BC_2$ through the secondary windings $W_2$ and *s* and the integrating resistors $R_1$ and $R_2$ of both grid control circuits in series.

The primary windings $W_1'$ and $W_1''$ in the two operating circuits OC′ and OC″ in the first stage 10 are connected in series in the input 12 thereof so that each of a series of unidirectional current pulses applied to the input 12 causes the restored section in the first stage to operate. In a similar manner, the two primary windings $W_1'''$ and $W_1''''$ of the operating circuits OC‴ and OC″″ in the second stage 11 are connected in series in the input 13 thereof which in turn is connected to the output 14 of the first stage 10 so that each of a series of pulses appearing in the output of the first stage operates that section in the second stage which is restored at the time that such pulse is created.

With the specific arrangement illustrated herein, when each section S in either stage operates, it serves to restore the companion section in that stage and, at the same time, prepares the companion section for subsequent operation by the next pulse applied to that stage. Connections are provided between the anode A in each section S and the primary winding *p* in the restoring circuit SC of the companion section in the same counter stage to enable each of the sections S in each stage to be restored in response to the operation of the other section in that same stage. Likewise connections are provided between the anode A of each section S and the auxiliary winding $W_3$ in the operating circuit OC in the companion section of the same stage to enable the operation of each section to prepare the other section in the same stage for subsequent operation.

More particularly, in order to achieve the desired inter-action of the sections, the anode A′ of the first section S′ is connected to an anode supply conductor PVC through the auxiliary winding $W_3''$ in the operating circuit OC″ and through the primary winding $p''$ of the restoring circuit SC″ in the second section, in series. With this arrangement the second section S″ is restored and the operating circuit OC″ in the second section is prepared for operation, whenever a pulse operates the first section S′. Similarly, the anode A″ of the second section S″ is connected to the anode supply conductor PVC through the auxiliary winding $W_3'$ in the operating circuit OC′ and through the primary winding $p'$ of the restoring circuit SC′ in the first section S′ in series. Likewise with this arrangement the first section S′ is restored and the operating circuit OC′ in the first section is prepared, whenever a pulse operates the second section S″.

In the case of the second section S″, the anode A″ is further connected to the anode supply conductor PVC in series through the windings $W_3'$ and $p'$ mentioned and also in series through primary windings $W_1'''$ and $W_1''''$ of the two operating transformers $T_1'''$ and $T_1''''$ in the second stage 11 (through the first stage output 14 and the second stage input 13), so that whenever the second section S″ operates a pulse appears at the output 14 of the first stage 10 and this pulse is applied to the input 13 of the second stage 11. Such a pulse applied to the second stage serves to operate whichever section in that stage is at that time in a restored condition and prepared for operation as previously mentioned.

Also more particularly, the anode A‴ of the third section S‴ is connected to the anode supply conductor PVC through the auxiliary winding $W_3''''$ in the operating circuit OC⁗ and through the primary winding $p''''$ of the restoring circuit SC⁗ in the fourth section S⁗ in series. Also with this arrangement, the fourth section S⁗ is restored and the operating circuit OC⁗ in this section is prepared, whenever a pulse operates the third section S‴. Similarly, the anode A⁗ of the fourth section S⁗ is connected to the anode supply conductor PVC through the auxiliary winding $W_3'''$ in the operating circuit OC‴, and through the primary winding $p'''$ of the restoring circuit SC‴ in the third section S‴ in series. Also, likewise with this arrangement, the third section S‴ is restored and the operating circuit OC‴ in this section is prepared, whenever a pulse operates the fourth section S⁗.

If desired, the anode A⁗ of the fourth section S⁗ may be further connected to the anode supply conductor PVC through the winding $W_3'''$ and $p'''$ mentioned, and primary windings $W_1$ of operating circuits OC in the third counting stage (not shown) similar to each of the two counting stages described, and the anode A in the second section of the third counting stage may in turn be similarly connected to the fourth stage, and so on if counts in groups higher than four are desired. With such an extended arrangement, a pulse is created in the output of each stage whenever the second section of that stage operates and each pulse applied to the input of each stage operates whichever section in that stage happens to be in a restored condition and prepared for operation at the time the pulse is applied.

In order to facilitate counting, an indicator preferably in the form of a glow lamp GL′ is connected in the first section S′ of the first stage 10, and another indicator of the same type GL‴ is connected in the third section S‴ in the second stage 11. Each of these indicators glows when the pentode P in the corresponding section is conducting to its anode A and is dark when the corresponding pentode is not conducting. Each glow lamp GL is connected at one end to a reference voltage conductor RVC and at the other end to the screen grid SG of the pentode P in the respective sections, as more fully explained hereinbelow.

In one method of operating this counter, the first and third sections S′ and S‴ are restored and the second and fourth sections S″ and S⁗ of the counter are operated when a count of zero is to be indicated. Thereupon, when a series of pulses is applied to the counter, the first pulse causes the first section S′ to operate, and the second section S″ to restore, thus causing the first glow lamp GL′ to light up. When the second pulse is applied, it causes the second section S″ to reoperate and the first section S′ to restore, thus turning off the first glow lamp GL′. Also, at the time the second pulse is applied, the operation of the second section S″ causes a pulse to be transmitted to the second stage 11, thus operating the third section S‴ and restoring the fourth section S⁗, and causing the second glow lamp GL‴ to light up. When a third pulse is applied, the first section S′ again is operated and the second section S″ is restored, thus lighting up the first glow lamp GL′ again but without disturbing the second glow lamp GL‴. When a fourth pulse is applied, the second section S″ is operated and the first section S′ is restored thus turning off the first glow lamp GL′. At the same time the operation of the second section S″, causes a pulse to be transmitted to the second stage 11 thus operating the fourth section S⁗, and restoring the third section S‴, and turning off the second glow lamp GL‴. Thus, with this arrangement, a count of one is indicated when only the first glow lamp GL′ is lit, a count of two is indicated when only the second glow lamp GL‴ is lit, a count of three is indicated when both glow lamps GL′ and GL‴ are lit, and a count of four or zero is indicated when both glow lamps are off, and the counting cycle is recommenced with every fourth pulse.

Before explaining the detailed operation of the counting circuit, it is desirable to describe in somewhat more detail various individual parts of the circuit.

*Trigger circuit construction*

Figure 3:
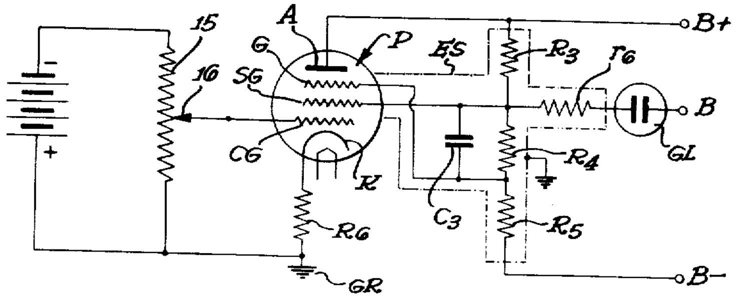
Fig. 3 is a rudimentary wiring diagram of the trigger circuit of the type used in the electronic counter of Fig. 1.

Referring first to Fig. 3, there is illustrated one of the pentodes P together with its associated electrode voltage supply circuit, including three potential dividing resistors $R_3$, $R_4$, and $R_5$, connected in series in the order named between the B+ terminal and a B− terminal. A positive voltage with respect to ground is supplied to the B+ terminal, and a negative voltage with respect to ground is supplied to the B− terminal from a regulated voltage supply. The anode A is connected directly to the B+ terminal, the screen grid SG is connected to the junction between the first voltage dividing resistor $R_3$ and the second resistor $R_4$, and the suppressor grid G is connected to the junction between the second voltage dividing resistor $R_4$ and third voltage dividing resistor $R_5$. A glow tube GL is connected in series with a decoupling and current limiting resistor $r_6$ between the screen grid SG and an auxiliary terminal B which operates at a suitable intermediate reference voltage to cause the glow lamp GL to ignite while the pentode P is conducting and to remain off while the pentode is not conducting. The B+ and B− terminals are connected respectively to the positive and negative voltage conductors PVC and NVC of Fig. 1, while the terminal B is connected to the reference voltage conductor RVC of Fig. 1.

A condenser $C_3$ is connected across the second resistor $R_4$, and a cathode resistor $R_6$ is connected between the cathode K and ground GR in order to accelerate a change in condition of the tube from its conducting state to its non-conducting state or vice versa.

Preferably the circuit elements connected to the screen grid SG and the suppressor grid G including the resistors $R_3$, $R_4$, $R_5$, and $R_6$ and the condenser C are enclosed within a grounded electrostatic shield ES. The shields around the circuit elements connected to the screen grid SG and suppressor grid G in the respective sections S of the counting circuit are not shown in Fig. 1. However, they are the same type as that illustrated in Fig. 3. These shields prevent capacitive interaction between the screen grid and suppressor grid circuits of each section with other portions of the counter.

In order to facilitate an understanding of how the circuit of Fig. 3 is restored and operated by changes in the bias applied to the control electrode CG, consider a potentiometer 15 having its positive and grounded and having a sliding contact 16 thereon which is connected to the control electrode CG. And for convenience, consider the operation of this circuit when the circuit elements have the particular circuit constants with which it was supplied in an actual model of the counter illustrated in Fig. 1. More particularly, the pentodes used were 6SJ7's and the value of the individual circuit elements used were those indicated in the following table.

| | | |
|---|---|---|
| $R_3$ | M | 50 |
| $R_4$ | M | 300 |
| $R_5$ | meg | 1.0 |
| $R_6$ | ohms | 150 |
| $C_3$ | μμf | 100 |
| $R_6$ | meg | 2 |

where M is the abbreviation for kilohms and meg. is the abbreviation for megohms. The lamp used was a neon glow lamp. The B+ terminal was connected to a +250 volt terminal of a regulated source of direct current; the B− terminal was connected to the −520 volt terminal of the regulated source of direct current; and the intermediate terminal was connected to the regulated source at about +35 v.

*Trigger circuit operation*

With the circuit elements having the constants indicated and connected to a potential supply providing the voltages indicated, this circuit has two stable conditions depending upon the value of the bias voltage applied to the control electrode CG. Thus the tube is conducting to the anode after the negative bias on the control grid CG is raised to a value greater than about −2.0 v. and is non-conducting to the anode after the negative bias is lowered to a value less than about −1.0 v. When in either of these conditions, it is found that if the bias voltage of the control grid CG is changed to a value in a range between a low voltage threshold of about −1.0 v. and a high voltage threshold of about −2.0 v. the condition of the circuit does not change. Thus, for example, if the pentode P is conducting with about −2.0 v. or more on the control grid CG, and the bias voltage is decreased to a value between about −2.0 v. and about −1.0 v., the pentode still conducts normally, with very little variation in plate current. However, when the bias is decreased to some value less than about −1.0 v., the pentode P suddenly stops conducting, and remains non-conducting until at such time the bias is increased to about −2.0 v., or more. However, if the bias is reduced below about −1.0 v. the tube becomes non-conducting, and remains non-conducting even though the bias return to some higher value less than about −2.0 v. It is to be noted that while the pentode P is conducting no increase in the bias voltage has any triggering effect whatever, and while the pentode is non-conducting no decrease in bias has any triggering effect whatever.

While the pentode P is conducting, the current flowing to the anode is 5.0 ma., the voltage at the screen grid is +136 v., the current to the screen grid is 1.4 ma., and the voltage on the suppressor is −20 v. When the pentode P is non-conducting to the anode A, the voltage on the screen grid SG is +76 v. and the current thereto is 2.8 ma. and the voltage on the suppressor grid is −60 v. Thus, it will be noted that when the pentode P is conducting, a large potential is impressed upon the glow lamp GL, causing it to glow, and when the pentode is non-conducting, a low voltage is applied to the glow tube, causing it to remain dark.

It is to be noted that while the bias on the control electrode CG remains within the range specified above, a change in bias voltage causes very little change in anode current. However, it does cause a change in the cathode current, which change is absorbed primarily by the screen grid SG. It is this factor which permits the pentode P to operate as a negative trans-conductance tube. Thus for example, while the pentode P is conducting, the anode current remains at 5.0 ma. as the bias is reduced to −1.0 v. As the bias is reduced further, the current to the screen grid SG increases sufficiently to reduce its voltage and at the same time to reduce the voltage on the suppressor grid G. As the suppressor grid G becomes more negative, further current is driven to the screen grid SG, and these two grids G and SG being tied together electrostatically by the condenser $C_3$, this quickly drives the anode to cut off. In a similar manner, if the pentode P is non-conducting, then, as the bias on the control electrode CG gradually exceeds −2.0 v., the current to the screen grid SG is reduced, thereby causing its voltage to increase, and at the same time, the voltage of the suppressor grid G to become more positive until the point is reached where these two grids SG and G become sufficiently positive to permit current to pass from the cathode K to the anode A. When this occurs the current to the screen grid is further reduced, and the anode current is quickly driven to its maximum value.

From the foregoing discussion, it is readily appreciated that while the pentode P is normally biased in the range between −1.0 and −2.0 v. and operating, if a positive pulse is applied to the control electrode CG sufficient to drive the control electrode beyond the low voltage threshold, the pentode will be restored. In a similar manner, if the pentode is normally biased in the above range and restored, a negative pulse of sufficient amplitude applied to the control electrode CG will cause the pentode to operate.

The cathode resistor $R_6$ in the above circuit acts degeneratively to minimize effects of fluctuations of the threshold voltages that occur as a result of spontaneous changes occurring in the voltage supply, or thermal drifts in cathode emission, etc., and to spread the threshold voltages farther apart than they would otherwise be in the absence of this resistor. However, because the pentode is capable of operating as a negative transconductance device at the instant of change from non-conducting to conducting condition, as described hereinabove, then so far as effects due to changes in cathode voltage are concerned in their relationship to control grid voltages, it is clear that at the time that operation (i.e., anode conduction) of the pentode is initiated by a pulse, any increase of cathode current drives the cathode K more positive thus increasing the grid-to-cathode voltage and accelerating the turning on of the anode current to its full value, due to regenerative action of resistor $R_6$. Conversely, when restoration of the pentode is initiated by a pulse, the decrease in cathode current causes the cathode to become less positive, thus decreasing the grid-to-cathode voltage, and accelerating the cutting off of the flow of anode current. Thus in effect, the presence of the cathode resistor $R_6$ in a tube operating in the negative trans-conductance circuit serves as a signal regenerative element so far as triggering signals are concerned so that it enhances the effect of any signal impressed upon the control grid.

Each of the pentodes P in the counter circuit of Fig. 1 is operated in the manner hereinabove described in detail in connection with the description of Fig. 3. In practice the control grids CG in the various sections S of the counter are normally biased through the corresponding biasing conductors $BC_1$ and $BC_2$ to about 1.7 v., that is, to a value intermediate the upper and lower threshold values of the triggering circuits which include the pentodes P. Furthermore, the primary winding $p$ inter-connecting the anode A of each section with the restoring circuit SC of the companion section is so connected that whenever one of the sections operates it impresses upon the grid circuit GC of the companion section a positive pulse of such magnitude as to cause the latter section to restore. Likewise, the primary windings $W_1$ which inter-connect the respective operating circuits OC in any stage of the counter section with a common current source are so connected that whenever a unit current pulse is applied to these primary windings, a negative pulse of sufficient magnitude is applied to the restored section in that stage to cause this section to operate.

*Transformer construction*

Figures 4, 5, 8:
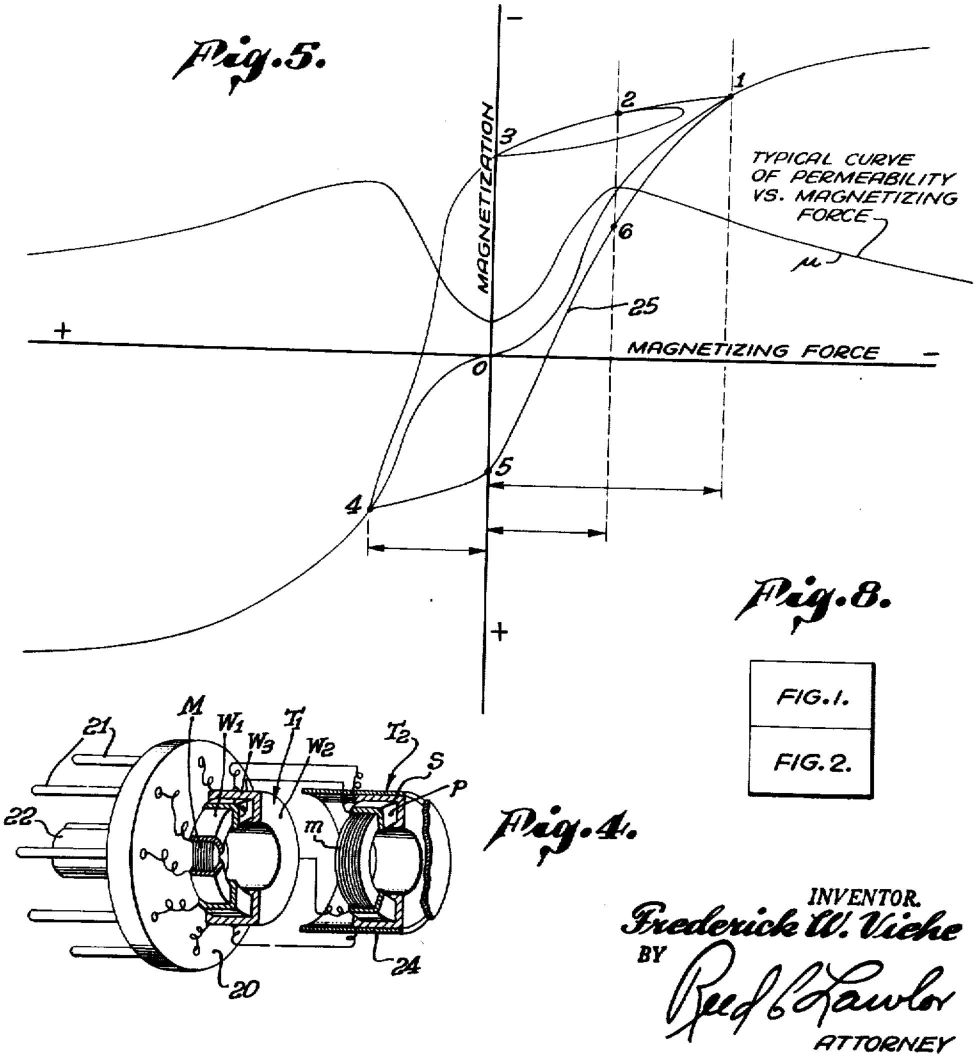
Fig. 4 is an isometric sectional view of a transformer unit incorporating features of my invention.
Fig. 5 is a graph representing various magnetic characteristics of a magnetic core used as a memory element in the transformer of Fig. 4.
Fig. 8 is a diagram illustrating the manner of assembling the drawings of Figs. 1 and 2 to represent a complete electronic counter together with its auxiliary circuits.

Referring now to Fig. 4, there is illustrated an arrangement of transformers which is particularly suited for use in the grid control circuits of the various sections of the counter of Fig. 1. This transformer arrangement includes the three-winding transformer $T_1$ and the two-winding transformer $T_2$, both of circular configuration mounted on one side of a circular base 20 and with their axes aligned with the axis of the base. On the opposite side of the base, there are provided eight prongs 21 extending in a direction parallel to the axis of the base, and circumferentially spaced thereon. Also on the same side of the base, there is an axially-projecting locking member 22 which serves to register the base upon the socket (not shown) into which it is plugged.

The cores M and $m$ of both transformers are ring-shaped. Preferably the radial width of the core sections of the three-winding transformer $T_1$ is small compared to the core diameter, so that the magnetization of the core material in the outer periphery will be about the same as the core material at the inner periphery. In practice, the diameter of the core is preferably about ¼″, and the radial-width or annular thickness of the core is less than about $1/10$ of the diameter. In an actual three-winding transformer $T_1$ used in the counter of Fig. 1, the ring core comprises 8 laminations of annealed transformer silicon steel stacked to a thickness of about 0.2″. In actual practice, the core $m$ of the two-winding transformer $T_2$ has the same diameter and radial-width as the core of the three-winding transformer $T_1$, in order to simplify and standardize the construction of the entire assembly.

All the windings on the transformers are wound toroidally on the respective cores and are thus linked by flux in said cores, and all of the windings and all of the laminations are mutually insulated from each other.

In a specific example of the three-winding transformer $T_1$ used in Fig. 1, the primary winding $W_1$ has 500 turns, the auxiliary winding $W_3$ has 250 turns, and the secondary winding $W_2$ has 300 turns. The ends of each of these windings are connected to different pairs of prongs 21, except for one end of the auxiliary winding $W_3$ which is connected by a jumper to one end of the associated primary $p$ of two-winding transformer $T_2$. Similarly, the primary winding $p$ of the two-winding transformer is provided with 225 turns and the secondary winding $s$ with 300 turns, opposite ends of each of these windings being likewise connected to different pairs of prongs 21, with the exception above noted.

It is to be noted particularly that the number of turns in the auxiliary winding $W_3$ is half the number of turns in the primary winding $W_1$ of the three-winding transformer $T_1$. With this arrangement, if equal currents flow in these two windings in such direction as to establish opposing magnetizing forces in the core M thereof, the direction of magnetization of the core is determined by the current flowing in the primary winding $W_1$ as long as both windings $W_1$ and $W_3$ are energized, and is in the opposite direction and of the same amount when the auxiliary winding $W_3$ is energized alone.

In a specific example of the counter of Fig. 1, the values of the circuit constants of the elements in the integrating circuits connected to the two transformers in each section are given as follows:

| | | |
|---|---|---|
| $C_1$ | μf | 0.02 |
| $R_1$ | M | 10 |
| $C_2$ | μf | 0.005 |
| $R_2$ | ohms | 500 |

The material of which the core M of the operating transformer $T_1$ is composed is preferably such that it has a high permeability and a high degree of retentivity. Preferably, the core is substantially closed, having no air gap therein of such length that it tends to increase the reluctance to any substantial degree or to present a pronounced demagnetizing force on the magnetic circuit. Preferably, this material is also of such a nature that it has a maximum permeability at a low value of magetization force. Preferably, a soft ferromagnetic material is used which has a permeability of about 5,000 to 100,000, when the magnetizing force is less than about 1 or 2 oersteds. For convenience the core $m$ of the restoring transformer $T_2$ is composed of like material and is also substantially closed.

A small paper cylinder 24 is slipped over the two transformers $T_1$ and $T_2$ after the transformer leads have been soldered to the prongs 21 and this cylinder is then filled with molten-wax to provide a compact transformer assembly for use in each section of the counter.

*Operation of magnet core*

Considering now, a typical hysteresis loop of the ring core M of the three-winding, or operating, transformer $T_1$, reference is made particularly to Fig. 5 wherein there is represented a graph of such a hysteresis curve 25. In this graph ordinates represent magnetization and abscissae represent magnetization force. When a unit current is applied to the primary winding $W_1$ and no current is applied to the auxiliary winding $W_3$, the magnetization force and the magnetization are at their maximum value as indicated by the point 1 on the curve. Thereafter, if a unit current is applied to the auxiliary winding $W_3$, so as to produce an opposing magnetization force, the magnetization force is reduced to one half value, while the magnetization is reduced only slightly as indicated by the point 2 of the curve. If the core M is magnetized only by a unit current passing through the primary winding $W_1$, and this current is then shut off, the magnetization force reduces to zero, while the magnetization falls off only slightly because of the high percentage retentivity of the core, as indicated by point 3 of the curve. On the other hand, if unit currents are passing through both the primary and the auxiliary windings $W_1$ and $W_3$ so that the magnetization force and magnetization are at values represented by point 2, then if the current in the primary winding $W_1$ is shut off, while that in the auxiliary windings $W_3$ remains, the flux in the core reverses assuming an almost equal value, due to the reversal of the net value of the magnetization force as represented by point 4 of the curve. If, while the core is so magnetized, the current in the auxiliary winding $W_3$ is then cut off, the magnetization force is reduced to zero, but the magnetization falls off only slightly due to the high degree of retentivity of the core material, as indicated at point 5. If, however, a unit current is applied to the primary winding $W_1$ to provide a magnetization force of opposite direction while the auxiliary winding $W_3$ is so energized, the magnetization force is reversed and the magnetization is also reversed, assuming a value of about half its maximum value as indicated by the point 6. Thereafter, if the unit current in the auxiliary winding $W_3$ is shut off while the current remains flowing in the primary winding $W_1$, the magnetization force is doubled, and the magnetization is about doubled attaining its maximum value as represented by point 1. If on the other hand, the core is magnetized to the amount indicated by point 5, and then a unit current is applied to the primary winding $W_1$, the magnetization in the core reverses and attains its maximum value as represented by a point very near point 1. It is understood of course that magnetization of the core may not always return to the same value as one previously attained but at least returns to one of approximately the same value.

For convenience, an operating core M is considered positively magnetized if it is magnetized in such a direction that it is prepared for operating the associated negative trans-conductance pentode P upon the application of a unit current; and a core magnetized in the opposite direction is considered negatively magnetized. Also for convenience a magnetization force is considered as having the same sign as the magnetization which it produces. Furthermore, for convenience, the conditions of the transformer core M corresponding to points 1, 2, 3, 4, 5, and 6 are hereinbelow referred to as condition 1, condition 2, condition 3, condition 4, condition 5, and condition 6 respectively.

It will be recalled that the voltage induced in the secondary winding of a transformer is proportional to the rate of change of flux in the transformer core. It will also be recalled that the voltage generated across the condenser of an integrating circuit connected across such a secondary winding is proportional to the time interval of the voltage produced across that secondary winding. Accordingly, the integrating circuit $IC_1$ connected across any of the secondary windings $W_2$ cooperates therewith to produce across the condenser $C_1$ of the integrating circuit a voltage which is proportional to and in phase with the flux change which occurs in the corresponding transformer core M. This condition applies so long as the time constant of the integrating circuit $IC_1$ is long compared to the time interval during which the flux change in question occurs as is the case with these circuits. Considering the hysteresis curve 25 represented in Fig. 5, it will be noted that large changes of flux in each core M occur under some of the conditions mentioned above and small changes under other conditions, and that some of these changes are in one direction, and some are in the other, according to various circumstances including the previous history of the core. Since each of these changes of flux occurs rapidly, the corresponding voltage induced in the secondary winding $W_2$ of each operating transformer $T_1$ is substantially proportional to the flux change in question.

*Operation of counter*

Considering now, the normal functioning of the first stage 10 of the counting circuit of Fig. 1 in detail, in the light of the foregoing detailed explanation regarding the values and characteristics of individual circuit elements therein, assume that the first and third sections S′ and S‴ are in a restored condition, and that the second and fourth sections S″ and S″″ are in an operated condition in a normal cycle of operation. Under these circumstances no anode current is flowing in the first pentode P′, but unit anode current is flowing in the second pentode P″. Due to the previous history of the circuit, the core M″ of the three-winding transformer $T_1''$ in the second section S″ is negatively magnetized to almost its maximum value, the core being in condition 3, thus in effect remembering the previous history of this circuit. On the other hand, the core M′ in the operating transformer $T_1'$ of the first section S′ is positively magnetized to a considerable extent due to the current in the auxiliary winding $W_3'$, the core being in condition 4 as a result of the previous history of the circuit.

Thereafter, when a unit current is applied at the input 12 of the first stage 10 and through the two primary windings $W_1'$ and $W_1''$ the magnetizing force in the first core M′ is reversed, causing the magnetization in this core also to reverse and to change by a large negative value, the core changing from condition 4 to condition 6. This large change of flux induces in the associated secondary winding $W_2'$ a large negative voltage which drives the control electrode CG′ of the first pentode P′ to a bias value exceeding −2.0 volts, thus rendering this pentode conducting and operating the first section S′. Simultaneously, the change in magnetizing force in the second core M″ causes the magnetization in that core to increase in the same direction changing from condition 3 toward condition 1. Upon operation of the first section S′, however, the current to the anode A′ of the first pentode P′ flows through the auxiliary winding $W_3''$ of the second operating transformer $T_1''$, reducing the magnetizing force in the core M″ of this transformer to a half value, and thus preventing the core from becoming magnetized to the maximum degree, but instead causing it to become magnetized to an intermediate amount in condition 2. During this operation a small negative voltage pulse is generated in the secondary winding $W_2''$ of the second operating transformer $T_1''$, due to the combined action of the two currents in the primary and the auxiliary windings $W_1''$ and $W_3''$ thereof; but at the same time the change in flux in the primary winding $p''$ of the restoring transformer $T_2''$, generates a relatively large positive voltage in the secondary winding $s''$ thereof of such a value, that there is a sufficiently large positive voltage pulse impressed upon the control electrode CG″ of the second pentode P″ as to cut off this pentode and thereby restore the second section S″. Thereafter, when the unit current pulse applied to the input 12 is turned off, the magnetization of the second operating core M″ is reversed, while plate current continues to flow in the first pentode P′, the magnetization of core M″ changing to condition 4. At the same time, because the current in the primary winding $W_1'$ of the first operating transformer $T_1'$ is turned off after the current in the auxiliary winding $W_3'$ thereof is turned off, the magnetization in this core M′ falls only slightly, the magnetization of this core attaining condition 3.

At this time the magnetization condition of the two cores M′ and M″ are interchanged from those initially assumed. Accordingly the second operating circuit is now prepared to be operated when the next pulse is applied to the input.

At the same time that the current to the anode A″ of pentode P″ is cut off as above described, a large positive pulse is generated in the secondary winding $W_2'''$ in the third section S‴ but this voltage has no effect since the pentode P‴ in this section is already restored. Subsequently, when the next pulse is applied to the input 12 of the first stage 10, the reversal of magnetization in the second core M″ causes the second section S″ to operate and the operation of this section causes the first section S′ to restore in the manner hereinabove described, the operation of the two sections being entirely symmetrical. When the second section S″ operates, it causes a unit current to flow in the third operating primary winding $W_1'''$, causing a large flux reversal and operating the third section, which, in operating, causes section S″″ to restore.

It is to be noted that each time the first and third sections S′ and S‴ operate, the glow lamps GL′ and GL‴ associated therewith glow, so that the accumulative count in a counter is indicated.

A condenser $C_4$ shunts the primary windings $W_1'$ and $W_1''$ of the first and second operating transformers $T_1'$ and $T_2''$ and another condenser $C_5$ shunts the windings $W_1'''$ and $W_1''''$ of the third and fourth operating transformers $T_1'''$ and $T_1''''$ in order to prevent high frequency components of current changes through the respective primary windings from capacitively inducing such large voltages in the grid control circuits GC as to affect their action. Preferably these by-pass condensers $C_4$ and $C_5$ tune the primary windings $W_1$ to a frequency which is high compared to the frequency of pulses to be counted. However, the Q's of the respective parallel networks including these condensers $C_4$ and $C_5$ and the corresponding transformer primaries are designed to be sufficiently low to prevent these networks from oscillating when pulse currents are applied thereto or removed therefrom; that is, each of these parallel networks is more than critically damped. If desired, separate tuning condensers may be connected across the individual primary windings. Suitable values for these by-pass condensers are: $C_4=0.005$ $\mu$f., and $C_5=0.005$ $\mu$f.

*Memory function*

In order to illustrate the memory and recall function of the operating cores, consider, by way of example, a case in which the counter is indicating a count of two. Under these circumstances, the second counter section S″ and the third counter section S‴ are in their operated condition and the first counter section S′ and the fourth counter section S⁗ are in their restored condition. Under these circumstances, the count of two is indicated by the fact that the first glow lamp GL′ is dark and the second glow lamp GL‴ is bright.

Under these conditions, a unit current is flowing to the anode A″ of the second pentode P″ through the auxiliary winding $W_3'$ of the first operating transformer $T_1'$ and the primary winding $p'$ of the first restoring transformer $T_2'$ and through the primary windings $W_1'''$ and $W_1''''$ of the third and fourth operating transformers $T_1'''$ and $T_1''''$. Also a unit current is flowing to the anode A‴ of the third pentode P‴ through the auxiliary winding $W_3''''$ of the fourth operating transformer $T_1''''$ and through the primary winding $p''''$ of the fourth restoring transformer $T_2''''$.

It is clear that under these conditions, because of the various currents flowing in the operating transformers $T_1$, the first, second, third and fourth operating cores M are respectively magnetized in conditions 4, 3, 1, and 2.

To de-energize the counter in such a way that it will be conditioned to recall the count of two, the various elements of the counter are de-energized in a predetermined sequence. In this de-energization process the respective operating cores M become magnetically polarized in specific directions corresponding to that count. Subsequently the elements of the counter are re-energized in a particular sequence in order to prepare the counter for recalling the count. Then a series of pulses equal in number to the maximum number indicated by the counter (in this case, four) are applied to the counter to recall and indicate the prior count of two.

More particularly, in de-energizing the counter, the first step is to de-energize the control grids CG in each counter stage in the order in which the stages are interconnected; that is, the control grids CG of the first stage 10 are de-energized before those in the second stage 11, and so on, if there are more than two stages. This sequence is followed in order to assure restoring the second or output section of each stage before de-energizing any following stage. The de-energization of the control grids in any stage effectively de-energizes the sections in that stage provided that precautions are taken to prevent these sections from operating momentarily when the other electrodes in those sections are de-energized. If this procedure is not followed, the operating cores of the following stages may not be properly polarized to remember the last condition of the sections in that stage.

The next step is to de-energize the anodes A of the various pentodes P. All of the anodes A may be de-energized simultaneously if desired, it only being important that the anodes in the respective stages are de-energized subsequently to the control grids CG in order to prevent spurious pulses from being created in the respective sections S by the multiple vibrator action that may otherwise occur. The next step in the de-energization process, is to de-energize the auxiliary grids SG and G, it being important that they be de-energized after the anodes in order to preclude any momentary conduction of the pentodes P that might otherwise occur. Thereafter, to complete the de-energization of the entire counter circuits, the heaters H associated with the respective cathodes K are de-energized.

In de-energizing the counter, the first biasing conductor $BC_1$, the second biasing conductor $BC_2$, and the anode supply conductor PVC, are grounded in the sequence mentioned, and then the negative voltage conductor NVC and the reference voltage conductor RVC are grounded together or in any sequence.

When the first biasing conductor $BC_1$ is grounded, in effect a positive pulse is applied to each of the control electrodes CG′ and CG″ in the first stage 10. The application of a positive pulse to the second pentode P″ renders it non-conductive. As a result, a negative pulse is induced in the control circuit GC′ of the first section S′ but this pulse added to the positive pulse simultaneously applied to the control electrode CG′ in the first section S′ is insufficient to cause this section to operate. As a result the magnetization of the first operating core M′ changes from the condition 4 to condition 5. At the same time no change occurs in the second operating core M″, it remaining in condition 3. Both pentodes P′ and P″ in the first stage 10 are now non-conductive and the two corresponding sections S′ and S″ are restored.

At the same time that the second section S″ restores, the unit current previously passing through the primary windings $W_1'''$ and $W_1''''$ of the third and fourth operating transformers $T_1'''$ and $T_1''''$ is terminated. When this current terminates, the magnetization of the third operating core M‴ changes from condition 1 to condition 3. As a result a small positive pulse is impressed upon the control electrode CG‴ of the third pentode P‴, this positive pulse being insufficient to restore the third section S‴. Also at the time that the current in the second pentode terminates the magnetization of the fourth core M⁗ is reversed, changing from condition 2 to condition 4, by virtue of the continuation of the flow of current to the anode A‴ of the third pentode P‴. As a result, a large positive pulse is impressed upon the control electrode CG⁗ of the fourth pentode P⁗ but this pulse has no effect since the fourth pentode P⁗ is already restored.

When the second biasing conductor $BC_2$ is grounded, in effect, a positive pulse is applied to both the third and fourth control electrodes CG‴ and CG⁗. The positive pulse applied to the third control electrode CG‴ causes the third pentode P‴ to restore, terminating the current to its anode A‴ and, as a result, generating a negative pulse in the control circuit GC⁗ of the fourth pentode P⁗. However, the net voltage impressed upon the fourth control electrode CG⁗ as a result of the concurrent application of this negative pulse and the positive pulse created by the termination of the current in the primary winding $W_1''''$ of the fourth operating transformer $T_1''''$ does not become sufficiently negative at any time to render the fourth pentode P⁗ conducting. As a result there is no change in the magnetizing force in the third operating core M‴ and it remains negatively magnetized in condition 3. On the other hand, when the current flowing to the third pentode P‴ through the auxiliary winding $W_3''''$ of the fourth operating transformer $T_1''''$ terminates, the magnetization condition of the fourth operating core M⁗ changes from the condition 4 to condition 5.

After the two biasing conductors $BC_1$ and $BC_2$ have been grounded, the anode supply conductor PVC and the negative voltage supply conductor NVC and the reference voltage supply conductor RVC are grounded and the heaters H de-energized in the manner previously explained, this portion of the de-energization process having no effect upon the magnetization of the operating cores M.

It is to be noted that after all of the control electrodes CG have been thus grounded, the operating cores M'' and M''' in the second and third sections S'' and S''' are negatively polarized; and the operating cores M' and M'''' in the first and fourth sections S' and S'''' are positively polarized. In general, regardless of the particular count previously indicated by the counter just prior to the grounding of the control electrodes CG in the manner explained, the operating cores M of those circuits which were last operating are negatively polarized and those in the sections which were last restored are positively polarized. In this way, a count image in the form of a magnetization pattern or picture is impressed upon the set of operating cores which corresponds uniquely to the last indicated count. Thus by this de-energization process the counter circuit is conditioned to facilitate the recall of the prior count provided the counter is suitably re-energized by virtue of the creation of a permanent magnetization pattern of that count. This pattern is used to control the recall of the last indicated count whenever desired.

*Recall function*

In order to re-energize the counter preparatory to recalling the last prior count, the heaters H associated with the cathodes K are first energized and the cathodes heated to their normal operating temperatures. Then the negative voltage conductor NVC is energized. Then the anode voltage conductor PVC and the auxiliary voltage conductor RVC are energized together, the energization of the anode voltage conductor PVC preferably being gradual in order to prevent any voltage shock to the circuit which might accidentally operate one or more of the pentodes P. The rate at which the anode voltage is raised to its full value should be slow enough to permit the voltage on the condenser $C_3$ connected between the screen grid SG and the suppressor G of each pentode P to maintain the suppressor sufficiently negative relative to the screen to prevent the pentode P from conducting to its anode A. Next, the biasing conductors $BC_1$ and $BC_2$ are energized to their normal negative voltages, it being immaterial in which order the biasing conductors are energized, since all of the pentodes P are non-conducting at the time. While it would be possible to energize the biasing conductors before energizing the anode voltage conductor PVC, the procedure described is preferred, since it permits the screen and suppressor grids SG and G to be energized to their maximum negative voltages at the time that positive voltage is applied to the anodes A, thus preventing accidental operation of any pentodes P. It is to be noted that this re-energization process is performed without operaating any counter section S and without disturbing the magnetization pattern of the count image previously impressed upon the set of cores M. With the counter thus re-energized in this manner, the circuit is prepared to recall the last previous count.

In order to recall the last prior count, four pulses of unit current are applied to the input 12 of the first counter stage 10. For example, when a last prior count of two is to be recalled, then when the first pulse is initiated, the magnetization of the first core M' is reversed from the positive value of condition 5 to the negative value of condition 1. This reversal of magnetization generates a large negative pulse which is impressed upon the control electrode CG' of the first pentode P' making it operate. Upon operation of the first pentode P', the resultant anode current flowing through the auxiliary winding $W_3''$ of the second operating transformer $T_1''$ in cooperation with the unit pulse applied to the primary winding $W_1''$ thereof, changes the magnetization of this core from condition 3 to condition 2 in the manner previously explained. Upon termination of the first unit pulse, the magnetization of the first core M' changes from condition 1 to condition 3. The small resultant positive voltage impressed upon the first control electrode CG' is insufficient to restore the first pentode P'. Also at the time of termination of the first pulse, the magnetizing force in the second operating core M'' is reversed, changing from condition 2 to condition 4. The resultant large positive pulse impressed upon the second control electrode CG'' has no effect, since the second pentode P'' is already restored. Because the first pentode P' is conducting, the first glow tube GL' shines.

When the second pulse is applied, the magnetization in the second core M'' reverses, changing from condition 4 to condition 6. The resultant large negative pulse impressed upon the second control electrode CG'' causes the second pentode P'' to operate. Upon operation of the second pentode P'', the resultant current flowing to its anode A'' causes a large positive pulse to be impressed upon the first control electrode CG' through the first restoring transformer $T_2'$, thereby restoring the first pentode P'. The termination of the current to the anode A' of the first pentode P' causes an increase in the magnetization in the second operating core M'' from condition 6 to condition 1. The resultant small negative voltage impressed upon the second control electrode CG'' is ineffective, since the second pentode P'' is already conducting. Also at the same time that the first pentode P' is restored, the first glow tube GL' darkens.

As a result of the application of the second pulse and the operation of the second pentode P'', the magnetization of the first core M' changes from condition 3 to condition 2 in accordance with the principles hereinabove explained. Also as a result of operating the second pentode P'', a unit pulse is initiated through the primary windings $W_1'''$ and $W_1''''$ of both the third and fourth operating transformers $T_1'''$ and $T_1''''$. The application of this unit pulse causes the polarity of the fourth operating core M'''' to reverse, the magnetization of this core changing from condition 5 to condition 1. The large resultant negative voltage impressed on the fourth control electrode CG'''' renders the fourth pentode P'''' conducting.

By the combined action of the current flowing in the anode A'''' of the fourth pentode through the auxiliary winding $W_3'''$ of the third operating transformer $T_1'''$, the magnetization of the third operating core M''' changes from condition 3 to condition 2. Termination of the second pulse causes the magnetization of the first core M' to reverse, changing from condition 2 to condition 4. The third pentode P''' remains restored and the fourth pentode P'''' remains operated in accordance with the principles set forth above.

When the third pulse is applied, the first section S' operates and the second section S'' restores, causing the first glow tube GL' to shine again and terminating the unit current previously applied to the second stage 11. When this unit current terminates, the magnetization of the third operating core M''' changes from condition 2 to condition 4, and the magnetization of the fourth operating core M'''' changes from condition 1 to condition 3, the third section remaining restored and the fourth section remaining operated. After the third pulse has terminated the first and fourth operating cores M' and M'''' are negatively polarized in condition 3, and the second and third operating cores M'' and M''' are positively magnetized in condition 4.

When the fourth pulse is impressed upon the input of the first stage, the first section S' restores, darkening the first glow tube GL', and the second section S'' operates, initiating a new unit pulse at the input 13 of the second stage 11. The initiation of the latter pulse causes the third section S‴ to operate, thereby lighting up the second glow tube GL‴ and also causes the fourth section S'''' to restore.

From the foregoing explanation, it is seen that when the fourth pulse has been applied, each of the sections S of the counter is in the same condition, that is operated or restored, that it was in prior to the de-energization of the entire counter. Thus by de-energizing and re-energizing the counter and then applying a series of pulses thereto in the manner described, it is possible to remember the count last indicated by the counter prior to its de-energization for an indefinite period and to recall that count.

*Zeroing procedure*

Not only may a count of this circuit be remembered and recalled, but, if desired, any count may be erased and the counter zeroed. In zeroing the counter of Fig. 1, consider, for example, a starting condition in which the counter indicates a count of 2. In this condition, the first and fourth sections S′ and S'''' are restored and the second and third sections S″ and S‴ are operating; and the first glow lamp GL′ is dark and the second glow lamp GL″ shines. While in this condition the first, second, third, and fourth operating cores are in conditions 4, 3, 1, and 2 respectively.

In the zeroing process a unit current pulse is applied to the input 12 of the first stage 10, operating the first section and restoring the second section. Then, while this pulse is still applied, the control electrodes CG′ and CG‴ of the first and third sections S′ and S‴ are grounded, restoring both of these sections; and then, the control electrodes CG″ and CG'''' of the second and fourth sections S″ and S'''' are biased very negatively to operate these sections. Then the negative bias on the control electrodes CG″ and CG'''' is reduced to a normal negative bias of about −1.70 volts, leaving the second and fourth sections S″ and S'''' operated. The grounded control electrode CG′ and CG″ are then ungrounded and the bias on these electrodes is raised to a normal negative basis of about −1.70 volts, leaving the first and third sections S′ and S‴ restored. The unit pulse current applied to the input 12 of the first stage 10 is then terminated. At the completion of this process, the first and third sections S′ and S‴ of the counter are restored, the second and fourth sections S″ and S'''' are operating, the two glow lamps GL′ and GL‴ are dark, and the counter is prepared to count pulses.

At the time that the unit pulse is applied to the input 12 of the first stage 10, the first core M′ changes from condition 4 to condition 6, operating the first section S′. The first section S′, in operating, causes the second section S″ to restore, as previously described, and the magnetization of the second core M″ changes from condition 3 to condition 2. When the second section S″ restores the magnetization of the first core M′ changes from condition 6 to condition 1 and the magnetization of the third core M‴ changes from condition 1 to condition 3 and that of the fourth core M'''' from condition 2 to condition 4. Thereafter, when the control electrodes CG′ and CG‴ in the first and third sections S′ and S‴ are grounded, restoring the pentodes P′ and P‴ in these sections, the first core M′ remains in condition 1 but the magnetization of the second core M″ changes from condition 2 to condition 1, the third core M‴ remains in condition 3, and the magnetization of the fourth core M'''' changes from condition 4 to condition 5. Then at the time that very negative bias is applied to the control electrodes CG″ and CG'''' of the second and fourth pentodes P″ and P'''' resulting in operation of these tubes, the magnetization of the first operating core M′ changes from condition 1 to condition 2 while the second operating core M″ remains in condition 1, that of the third operating core M‴ changes from condition 3 to condition 2 and that of the fourth operating core M'''' from condition 5 to condition 1. When the biases on all the control electrodes CG are returned to their normal values, no change occurs in the magnetization of the cores M. However, when the current pulse is terminated, the magnetization of the first core M′ changes from condition 2 to condition 4 and that of the second core M″ from condition 1 to condition 3.

It is to be noted that at this time, only the first operating core M′ is positively magnetized, being in condition 4, while the second, third and fourth cores are negatively magnetized, being in conditions 3, 2 and 1 respectively. With the pentodes in the conditions mentioned and the cores so polarized, the counter is ready to count pulses. If any other stages are cascaded in the counter and are similarly treated, the first sections of these stages are likewise restored and the last or output sections operated after the completion of the zeroing process and the operating cores in the first sections and those in the output sections of all stages following the first will be in conditions 2 and 1 respectively. While the zeroing process has been described with particular reference to zeroing the counter when a count of 2 is indicated, it is to be understood that the various sections of the counter are in the same final condition and the counter is prepared for counting pulses, at the completion of the zeroing procedure described irrespective of the initial conditions of the various sections of the counter, the only difference being in the specific history of the cores during the procedure.

*Auxiliary circuits*

As illustrated in Fig. 2 certain auxiliary circuits are provided to ensure reliable operation of the counter. These circuits include a pulse standardizer 30 for applying pulses to be counted to the input 12 of the first stage 10 of the counter, a zeroing circuit 32 for zeroing the counter, a control circuit 34 for automatically energizing and deenergizing the various electrodes of the counter and the pulse standardizer 30 in the desired sequence in order to remember and a recall a count, and a pulsing circuit 36 for applying a series of recalling pulses to the counter.

*Pulse standardizer*

The pulse standardizer 30 is in the form of a direct coupled D.C. amplifier comprising first, second, and third pentodes $P_5$, $P_6$ and $P_7$ connected in tandem amplifying relation between the input 38 and the output 40. The potentials for the various electrodes of these three pentodes are obtained from a voltage dividing circuit 42 including resistors $R_7$, $R_8$, $R_9$, $R_{10}$, $R_{11}$, and $R_{12}$ one end of which is connected to ground and the other end of which is connected to the negative voltage conductor NVC.

Negative pulses to be counted are applied to the first pentode $P_5$ through a coupling condenser $C_6$ and a potentiometer 44. This pentode $P_5$ is normally conducting and is driven beyond cut off by negative pulses exceeding a predetermined value determined by resistor $R_8$. The anode 46 of the first pentode $P_5$ is directly connected to the control grid 48 of the second pentode $P_6$ and the two connected to the potential dividing network 42 through a first plate resistor $R_{13}$. This resistor $R_{13}$ cooperates with the voltage of the voltage dividing network 42 to bias the second pentode $P_6$ beyond cut off as long as the first pentode $P_5$ is conducting and to render the second pentode $P_6$ conducting in a predetermined amount when the first pentode $P_5$ is driven beyond cut off.

The anode 50 of the second pentode $P_6$ is directly connected to the control electrode 52 of the third pentode $P_7$ and the two pentodes are connected to the potential dividing network 42 through a second plate resistor $R_{14}$. The third pentode $P_7$ is connected as a negative transconductance device in a manner similar to the pentodes P of the counter circuit. The second plate resistor $R_{14}$ and the potential dividing network 42 cooperate to maintain the third pentode $P_7$ non-conductive while the second pentode $P_6$ is not conducting, but maintains the third pentode $P_7$ conducting when the second pentode $P_6$ is conducting.

With this pulse standardizer 30, whenever a negative pulse having an amplitude exceeding a predetermined value is impressed upon the input 38, a unit pulse of the same magnitude of those generated in various sections of the counter is produced at the output 40.

The screen grid 53, the suppressor grid 54, and the anode 55 of the third pentode $P_7$ are energized through a voltage dividing circuit comprising resistors $R_3$, $R_4$, and $R_5$, similarly to the pentodes P of the counter circuits and a glow tube $GL_3$ is connected to the screen grid 53 of this pentode also in a similar manner. This glow tube $GL_3$ serves to indicate when pulses are being generated in the output of the pulse standardizer 30, and is particularly useful in connection with the adjustment of the potentiometer 44 at the input 38 to a suitable setting for picking up all the pulses of interest in the source of the pulses to be counted. During any such adjustments the third pentode $P_7$ is connected directly to the anode voltage conductor PVC by means of single pole double-throw switch 56. However, when pulse counting is desired the pentode is connected through output 40 directly to the input 12 of the first stage 10 of the counter by means of this switch.

The plate resistors $R_{13}$ and $R_{14}$ are preferably very large compared to the resistors $R_7$ to $R_{12}$ in the voltage divider 42 so that changes in plate current will not substantially affect the distribution of voltage on the voltage divider.

In de-energizing of the entire arrangement, the control grid 52 of the third pentode $P_7$ is grounded before the control grids CG in the counter, in order to be certain that any unit current generated by the pulse standardizer and impressed upon the first stage 10 of the counter is terminated before the biasing conductors $BC_1$ and $BC_2$ are grounded. Also, in re-energizing the pulse standardizer, the control electrode 52 remains grounded until after the other electrodes of this pentode $P_7$ have been energized to prevent applying a spurious pulse to the counter.

Suitable values of the circuit constants in the pulse standardizer 30 are as follows:

| | | |
|---|---|---|
| $R_7$ | M | 150 |
| $R_8$ | ohms | 300 |
| $R_9$ | M | 5 |
| $R_{10}$ | ohms | 350 |
| $R_{11}$ | M | 4.7 |
| $R_{12}$ | ohms | 350 |
| $R_{13}$ | M | 25 |
| $R_{14}$ | M | 25 |

The pentodes used in this circuit are 6SJ7's.

*Pulsing circuit*

The pulsing circuit 36 includes means for applying a negative voltage to the suppressor grid 57 of the first pentode $P_5$ of the pulse standardizer 30 sufficient to drive this pentode beyond cut-off and to produce a unit pulse at the output of the pulse standardizer 30.

The means for accomplishing this result includes a voltage divider 58 comprising resistors $R_{15}$ and $R_{16}$ connected between the negative voltage conductor NVC and ground, and switching means for connecting an intermediate point on this voltage divider 58 to the suppressor grid 57. Suitable values of these resistors are:

| | | |
|---|---|---|
| $R_{15}$ | meg | 1 |
| $R_{16}$ | M | 180 |

The switching means referred to includes a normally open push-button switch 60 which may be depressed momentarily to complete the circuit between the voltage divider 58 and the suppressor grid 57 once to produce a single pulse at the output of the pulse standardizer. The switching means also include a rotary switch 62 adapted to complete the circuit between the voltage divider 58 and the suppressor grid 57 a predetermined number of times in a single operation, so as to apply to the counter the proper number of pulses, in this case four, necessary to recall a prior count.

The rotary switch 62 comprises a metallic wheel 63 connected to the intermediate point of voltage divider 58, carrying an insulated lever 64 which is normally held against a first stop 65 by means of an insulated spring 66, and which may be moved to a second position against a second stop 67 by manually applying pressure to the lever 64 against the force of the spring 66. The wheel 63 carries a plurality of metallic teeth 68, in this case two, which contact a resilient switch element 69 once each in the movement of the wheel 63 from the first position to the second position and once each again with the movement of the wheel from the second position to the first. Upon making each contact, the circuit to the suppressor grid 57 is completed to produce the desired pulse. A condenser $C_7$ connected across the cotary switch 62 and aross the push-button switch 60 serves to prevent sparking when either of the switches referred to is operated. A suitable value of the condenser is: $C_7=0.005\ \mu f$.

The suppressor of the first pentode $P_5$ is connected to the voltage divider 42 of the pulse standardizer through a parallel network including a resistor $r_{17}$ and a condenser $C_8$ which has a time constant which is long compared to the period of any chattering that might occur upon the closing and opening of the contacts of the pulsing circuit but which is less than the interval between the successive closing of different contacts of the rotary switch 63. Suitable values of these circuit elements are:

| | | |
|---|---|---|
| $r_{17}$ | M | 27 |
| $C_8$ | $\mu f$ | 0.1 |

*Zeroing circuit*

The zeroing circuit 32 serves to restore the first and third sections S' and S''' and to operate the second and fourth sections S'' and S'''' so as to prepare the counter properly for counting pulses hereinabove explained. In order to bring about the zeroing of the counter automatically, the zeroing circuit is provided with three switches, namely, a pulsing switch 74, a grounding switch 75, and a biasing switch 76, which are ganged to close in the order named and then to open in the reverse order to bring about the desired results.

The pulsing switch 74 is arranged in parallel with the push-button switch 60 of the pulsing circuit 36 so that when this switch 74 is closed, it serves to generate a pulse in the output of the pulse standardizer 30.

The grounding switch 75 is arranged to ground the control grids CG' and CG''' of the first and third pentodes P' and P''' through two mutually insulated grounding conductors $BC_3$, $BC_4$. The first grounding conductor $BC_3$ is connected to the junction between the two condensers $C_1'$ and $C_2'$ in the grid circuit GC' of the first pentode P', and the second grounding conductor $BC_4$ is similarly connected to the junction between the condensers $C_1'''$ and $C_2'''$ in the grid circuit GC''' of the third pentode P'''.

The biasing switch 76 cooperates with a voltage divider 78 and two coupling circuits 80, to maintain a normal bias of about 1.7 volts on the two biasing conductors $BC_1$ and $BC_2$ while this switch is open and to raise the bias above about 2.0 volts when this switch is closed. The voltage divider 78 includes two resistors $R_{17}$ and $R_{18}$ connected between the negative voltage conductor NVC and ground. The junction between these two resistors $R_{17}$ and $R_{18}$ is connected to the respective biasing conductors $BC_1$ and $BC_2$ through two resistors $R_{19}$ in the respective coupling networks 80. The two condensers $C_9$ in the respective coupling networks 80 are connected directly across the respective biasing conductors $BC_1$ and $BC_2$ and ground so as to prevent an electrostatic pickup in the two grounding conductors $BC_1$ and $BC_2$ from actuating any section of the counter. Preferably these two condensers $C_9$ are located adjacent the grid circuits GC. The two coupling networks 80 serve to isolate the two bias conductors $BC_1$ and $BC_2$ from each other electrically and the constants of these circuits are so close that the grounding of the first biasing conductor $BC_1$ does not produce any substantial voltage change on the second biasing conductor $BC_2$. An auxiliary resistor $R_{20}$ is included in series with switch 76 so as to shunt the high voltage resistor $R_{17}$ of the voltage divider 78 when the switch 76 is closed. The shunting of this resistor $R_{17}$ raises the voltage of the junction between the resistors $R_{17}$ and $R_{18}$ so as to bias the control grids CG″ and CG″″ in the second and fourth sections S″ and S″″ to the desired point.

Suitable values of the circuit elements referred to are as follows:

| | | |
|---|---|---|
| $R_{17}$ | M | 300 |
| $R_{18}$ | M | 8.2 |
| $R_{19}$ | M | 4.7 |
| $R_{20}$ | M | 4.7 |
| $C_9$ | μf | 8.0 |

When these three switches 74, 75, and 76 are closed the first and third operating cores M′ and M‴ are magnetized in condition 2 and the second and fourth operating cores M″ and M″″ are magnetized in condition 1. Thereafter opening of the pulsing switch 74 terminates the current through the primary windings $W_1'$ and $W_1''$ of the first and second operating transformer $T_1'$ and $T_1''$ causing the magnetization of the first core M′ to change from condition 2 to condition 4 and that of the second core M″ to change from condition 1 to condition 3, as described above under "Zeroing Procedure." Opening of the grounding switch 75 and the biasing switch 76 have no effect on the magnetization of the cores.

While the opening and closing of the three switches 74, 75, and 76 have been described with reference to a particular sequence, it will be clear, in view of the foregoing explanation of the invention, that these switches may be opened and closed in other sequences to zero the counter, it only being important that the input sections S′ and S‴ are restored and the output sections S″ and S″″ be operating at the time that the current pulse applied by the pulse standardizer 30 to the counter is terminated.

*Power supply*

The power supply 81 for energizing the counter and the associated circuits is of the type which converts alternating current power into direct current power. This power supply 81 comprises a pair of input terminals 82 to which alternating current voltage is applied through a power switch 84 and two output terminals 85 and 86 at which the respective B+ and B− voltages of suitable values appear, and also two output terminals 87 at which low voltage cathode heater voltage appears. The power supply 81 is also provided with a terminal 88 which is grounded at a voltage between that of the B+ and the B− terminal. This power supply may be of any conventional type in which precautions are taken to prevent the appearance of voltages at the B+ and B− terminals, until the cathodes K of the various pentodes P energized from the heater terminals 87 have reached their normal operating temperature.

The heaters H of the various pentodes in the circuits described are energized directly from the heater terminals 87 so that the cathodes may be rendered thermally emissive or not according to whether the power switch 84 is closed or open. The voltages from the B+ and the B− terminals 85 and 86 are applied to the various portions of the circuits described and removed therefrom in the required sequence by means of the control circuit 34 which includes three relays, $L_1$, $L_2$, and $L_3$ and "on" switch 95, and "off" switch 91.

*Control circuit*

The first relay $L_1$ is of the slow-to-restore type and has first and second pairs of contacts $X_1$ and $X_2$, the two pairs being arranged to act in the order named when the relay operates and in the inverse order when it restores. The first pair of contacts $X_1$ is normally open and in a line between the B− terminal 86 and the negative voltage conductor NVC. The second pair of contacts $X_2$ is normally closed and when closed completes a grounding circuit between the connected ends of the solenoids $Y_1$ and $Y_2$ of the first and second relays $L_1$ and $L_2$, the connection to the latter relay only being made through a resistor $R_{21}$, connected between these solenoids.

The second relay $L_2$ is also of the slow-to-restore type but restores more rapidly than the first relay $L_1$, and is provided with first, second and third pairs of contacts, $X_3$, $X_4$, and $X_5$, the three pairs acting in the order named when the relay operates and in the inverse order when it restores. The first pair of contacts $X_3$ is normally closed to complete a circuit including a grounded resistor $R_{22}$ on one side thereof and a filter network 89 including a resistor $R_{23}$ and a condenser $C_{10}$ on the other side thereof. This resistance-capacitance network 89 is connected between that side of this pair of contacts $X_3$ and a voltage divider 89′ including two resistors $R_{24}$ and $R_{25}$ which supplies suitable voltages to the anode voltage conductor PVC and to the reference voltage conductor RVC. The second pair of contacts $X_4$ is normally opened and is included in a circuit between this resistance capacitance network 89 and the B+ terminal 85 of power supply 81. The third pair of contacts $X_5$ is normally open and is included in a line 90 which includes the solenoid $Y_3$ of the third relay $L_3$ and a normally closed "off" switch 91. This line 90 is connected on the load side of the main power switch 84.

The third relay $L_3$ is of the fast-to-restore type and is provided with four pairs of contacts $X_6$, $X_7$, $X_8$ and $X_9$, the first and second and third pairs being normally closed and the fourth normally open, and the four pairs being arranged to act in the order named when the third relay operates and in the inverse order when restored. The first and second pairs of contacts $X_6$ and $X_7$ are arranged between ground and the second and first biasing conductors $BC_2$ and $BC_1$ respectively. The third pair of contacts $X_8$ is arranged in a line including a small current limiting resistor $r_{25}$ between ground and an intermediate point on the potential divider 42 at the cathode 93 and ground serves to prevent shock to the volt-30. A large condenser $C_{12}$ connected between the cathodes 93 and ground serves to prevent shock to the voltage divider 42 when the contacts $X_8$ are opened and closed. Suitable values for the last two circuit elements mentioned are:

| | | |
|---|---|---|
| $r_{25}$ | ohms | 100 |
| $C_{12}$ | μf | 8.0 |

The fourth pair of contacts $X_9$ is arranged in parallel with a normally open "on" switch 95 which is connected in series with a resistor $R_{26}$ between the B+ terminal 85 and one end of the solenoid $Y_1$ of the first relay $L_1$.

The upper end of the voltage divider 89′ is connected directly to the anode voltage conductor PVC and an intermediate point between the resistors $R_{24}$ and $R_{25}$ is connected to the reference voltage conductor RVC. The resistor $R_{25}$ at the lower end of the voltage divider 89′ is shunted by a condenser $C_{11}$ which serves to ground the reference voltage conductor RVC so far as pulse frequencies are concerned and thus isolates the glow lamps GL from each other so that a pulse applied to one will not inadvertently ignite another. In the preferred form of the invention, the time constant of the resistance-capacitance network 89 through which the potential divider 89' is supplied is longer than the time constant of the resistance-capacitance networks including the resistors $R_4$ and $C_3$ connected between the screen grids and the suppressor grids of the respective pentodes P in the counter and the output pentode $P_7$ in the pulse standardizer. With this time constant so selected, as the anode voltage rises to its ultimate value during the energization of the various circuits, the voltage at the suppressor grids does not rise so fast as to cause anode conduction. This facilitates maintaining all tubes in a restored condition during circuit energization.

Suitable values of the circuit elements associated with the two voltage conductors PVC and RVC are:

| | | |
|---|---|---|
| $R_{22}$ | ohms | 10 |
| $R_{23}$ | do | 1 |
| $R_{24}$ | M | 40 |
| $R_{25}$ | M | 6 |
| $C_{10}$ | $\mu$f | 10.0 |
| $C_{11}$ | $\mu$f | 0.01 |

*Energization of circuit*

To energize the circuit, first the main switch 84 is closed causing the heaters H associated with the various cathodes of the pentodes P to be energized. Subsequently, after the voltages at the B+ and the B− terminals 85 and 86 have attained their normal operating values, the energization of the remaining electrodes of the various circuits is initiated by temporarily depressing the "on" button 95, operating the first relay $L_1$, and holding it closed until the sticking contacts $X_9$ of the third relay $L_3$ close to seal in the control circuit 34. Upon operation of the first relay $L_1$, as its first pair of contacts $X_1$ closes, thereby energizing the negative voltage conductor NVC and impressing negative voltages upon the screen grids and the suppressor grids of all the negative trans-conductance pentodes P', P'', P''', P'''' and $P_7$, and at the same time placing a suitable negative voltage across the potential divider 42 in the pulse standardizer 30. It is to be noted that this voltage divider 42 does not come into full operation because the intermediate point thereon is still grounded through resistor $r_{25}$ and the third pair of contacts $X_8$ of the third relay $L_3$. Also at the time that the negative voltage conductor NVC is energized, the voltage dividers 58 and 78 in the pulsing and zeroing circuits 36 and 32 are energized. However, the energization of the latter voltage dividers 58 and 78 does not have any effect upon the counter at this time, since the biasing conductors $BC_1$ and $BC_2$ are still grounded through the first and second pairs of the contacts $X_6$ and $X_7$ of the third relay $L_3$.

After the negative voltage conductor NVC is energized, the second pair of contacts $X_2$ of the first relay $L_1$ opens, thereby connecting the solenoid $Y_2$ of the second relay $L_2$ to the B+ terminal 85 through the resistor $R_{21}$, the solenoid $Y_1$ of the first relay $L_1$, the "on" button 95 and the resistor $R_{25}$, thereby operating the second relay. When the second relay $L_2$ operates, its first pair of contacts $X_3$ opens and its second pair of contacts $X_4$ closes, thereby ungrounding the resistance capacitor network 89 and connecting this network to the B+ terminal 85. When this occurs, the full voltage from the B+ terminal 85 is applied gradually through the resistance-capacitance network 89 to the anode voltage conductor PVC and the potential divider 89'. The time constant of this network 89 is made sufficiently long compared to that of the circuits including the condensers $C_3$ connected between the respective screen and suppressor grids that accidental operation of the negative transconductance pentodes P', P'', P''', P'''' and $P_7$ is prevented. The voltage on the reference conductor RVC rises to its normal value concurrently but more slowly. Preferably the time constants of the circuits associated with these two conductors PVC and RVC are so selected with reference to the constants of the voltage divider network 89' that the glow lamps GL do not flash even momentarily during the energization process. In any event, accidental operation of the pentodes P', P'', P''', P'''' and $P_7$ is prevented so long as the following relationship holds:

$$R_{23}C_{10} \gg R_4C_3$$

After the main voltage divider 89' has been energized, the third pair of contacts $X_5$ of the record relay $L_2$ closes, thereby completing the power circuit to the solenoid $Y_3$ of the third relay $L_3$ and operating this relay.

When relay $L_3$ operates, the first two pairs of contacts $X_6$ and $X_7$ open, thereby ungrounding the bias conductors $BC_1$ and $BC_2$ and permitting their voltages to attain their normal values as established by the voltage divider 78 in the zeroing circuit 32. Subsequently the third pair of contacts $X_8$ open, ungrounding the intermediate point of the potential divider 42 in the pulse standardizer 30 and permitting this voltage divider to attain its normal voltage distribution, rendering the first pentode $P_5$ therein conducting and leaving the second and third pentodes $P_6$ and $P_7$ therein non-conducting. Subsequently, the fourth pair of contacts $X_9$ close, sealing in the first relay $L_1$, and hence the entire control circuit 34 so that all three relays $L_1$, $L_2$, and $L_3$ remain operated even though the "on" button 95 subsequently released.

After all three relays $L_1$, $L_2$, and $L_3$ have operated in the manner described and the control circuit 34 is sealed in, the pulse standardizer 30 is ready to operate and the counter circuit is prepared to receive pulses therefrom, whether it be for the initial operation of the counter or whether it be to recall a prior condition thereof, or whether it be to zero the counter as above described, or for some other purpose.

*De-energization of circuits*

In order to de-energize the counter and the pulse standardizer automatically, the normally closed "off" button 91 is depressed, thereby de-energizing the solenoid $Y_3$ of the third relay $L_3$, causing this relay to restore. When this relay $L_3$ restores, the fourth pair $X_9$ of contacts opens, thereby de-energizing the first and second relays $L_1$ and $L_2$. The third pair of contacts $X_8$ thereupon close, grounding the intermediate point of the voltage divider 42 of the pulse standardizer 30. This grounding procedure impresses a positive pulse in the control grid 52 of the output pentode $P_7$ thereby rendering it non-conducting in the event that it is already conducting and terminating any unit current that might then be flowing in its output 40, for the reasons hereinabove explained. Thereupon the second pair of contacts $X_7$ close, grounding the first biasing conductor $BC_1$ and restoring any section S' or S'' of the first stage 10 of the counter which is operating at the time. Subsequently, the first pair of contacts $X_6$ closes, grounding the second biasing conductor $BC_2$ and restoring any section S''' or S'''' of the second stage 11 of the counter which is operating at the time.

The time required for the first and second relays $L_1$ and $L_2$ to restore exceeds the time required for the four pairs of contacts $X_6$, $X_7$, $X_3$ and $X_9$ of the third relay $L_3$ to restore. Accordingly, after the restoration of the third relay $L_3$ is complete, the second relay $L_2$ restores, its third pair of contacts $X_5$ opening first, thereby breaking the circuit to the solenoid $Y_3$ of the third relay $L_3$ so that the subsequent release of the "off" button 91 has no effect thereon. Then the second pair of contacts $X_4$ open and the first pair of contacts $X_3$ close in the sequence named, removing the B+ voltage from the voltage divider 89' and grounding the positive end thereof through the resistor $R_{22}$.

This resistor $R_{22}$ is included in the circuit of the first pair of contacts $X_3$ of the second relay $L_2$ to retard the decay of voltage on the anode voltage conductor PVC. It is to be noted that the anode voltage decreases gradually as a result of the combined action of this resistor and the resistance capacitance network 89. By so limiting the rate of change of anode voltage negative voltage pulses electrostatically induced on the control electrodes are prevented from exceeding the value required to operate any of the previously restored negative transconductance pentodes P′, P″, P‴, P⁗ and $P_7$.

After the second relay $L_2$ is completely restored, the first relay $L_1$ restores, thereby closing the second pair of contacts $X_2$ thereof to ground one end of the solenoid $Y_1$ of the first relay and to short out the solenoid $Y_2$ of the second relay $L_2$. Thereafter the first pair of contacts $X_1$ opens thereby de-energizing the negative voltage conductor NVC. Thereafter the cathode heaters may be de-energized if desired by opening the power switch 84.

In order to cause the electrodes of the various circuits to become de-energized in the proper sequence in the event of a power failure or in the event the control circuit 34 is de-energized by opening the main power switch 84 before depressing the "off" switch 91, suitable time delay circuits 97 and 98 are incorporated in the power supply 81 in association with the B+ and the B− terminals 85 and 86. Thus, in the event that the power fails, the solenoid $Y_3$ of the third relay $L_3$ becomes de-energized just as if the "off" switch 91 were depressed, causing the three relays $L_1$, $L_2$, and $L_3$, to restore in the manner hereinbefore explained. In this case, in view of the fact that the voltages are maintained at the B+ and the B− terminals 85 and 86 by means of the time delay circuits 97 and 98 until after the three relays $L_1$, $L_2$, and $L_3$ have been restored, the counter circuit memory function is preserved. It is to be noted that the cathodes of the various pentodes present remain thermally emissive until after the other electrodes of the pentodes have been de-energized because of the thermal lag of the cathodes even after the filament voltage is removed from the heaters.

Thus it is seen that I have provided a system for automatically de-energizing and re-energizing the elements of the counter circuit and standardizer circuit in the proper time relation required to remember and recall the last indicated count. While I have illustrated my invention as applied to a counter, it will be apparent that in fact I have discovered principles for remembering and recalling a condition of any type of circuit. Clearly therefore many modifications may be made in this circuit, and many other applications of the general principles illustrated therein may be made without departing from the scope of my invention.

*Ring circuit construction*

Figure 6:
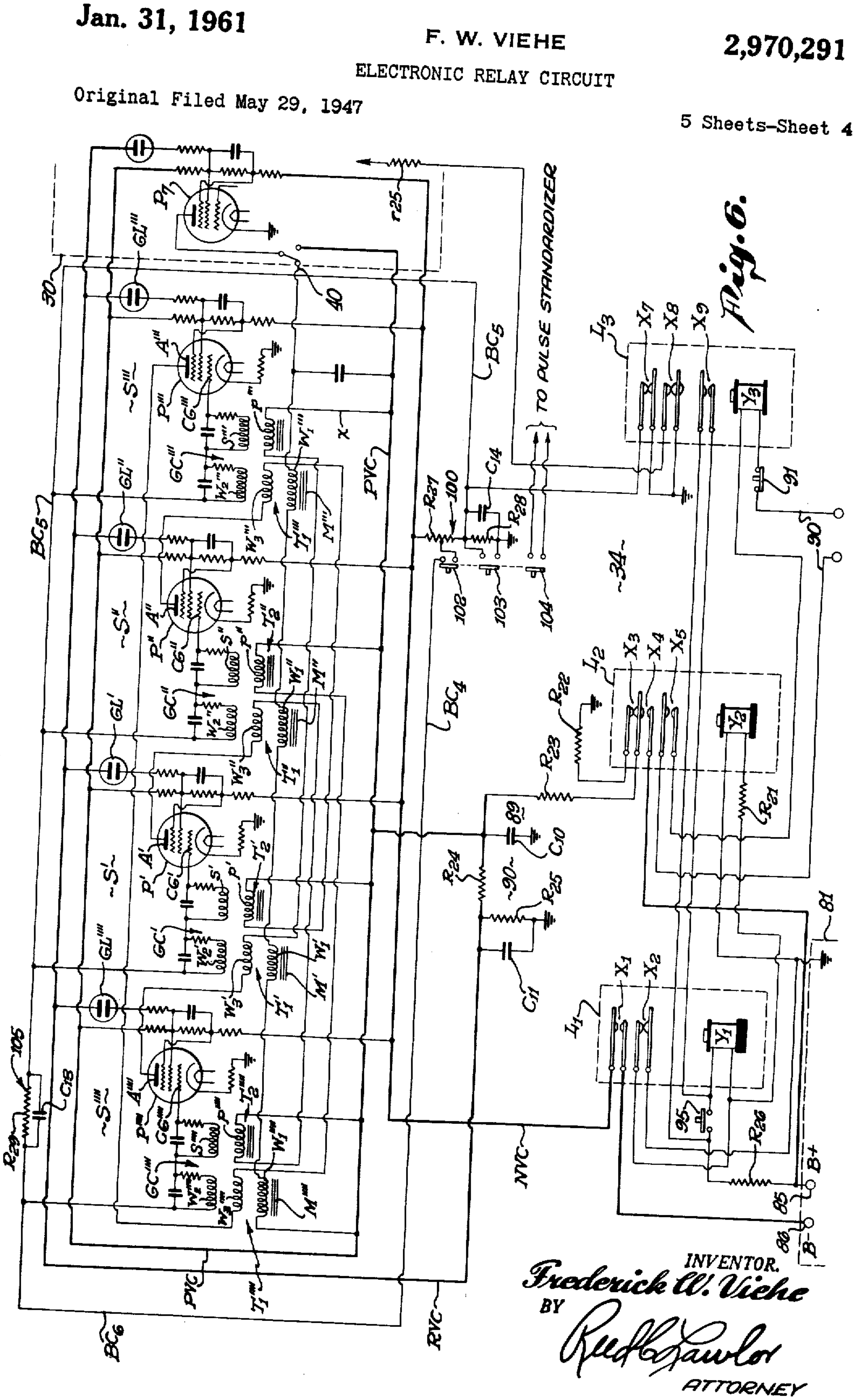
Fig. 6 is a wiring diagram of a ring circuit used as a scale-of-four counter, together with its associated auxiliary circuits, incorporating features of my invention.

In Fig. 6 I have illustrated the application of my invention to a ring circuit adapted to operate a scale-of-four counter. In describing this circuit the same symbols are used to indicate similar elements according to the system explained hereinabove, the same symbols being used herein as far as possible. This circuit includes four sections S′, S″, S‴ and S⁗ arranged sequentially in a ring. Each section S includes a pentode P connected as a negative transconductance device in the manner hereinbefore described. A control circuit GC including a three-winding operating transformer $T_1$ and a two-winding restoring transformer $T_2$ of the type hereinbefore described is included in each of the control circuits. A glow tube GL is connected in the output of each of the pentodes in the manner hereinbefore described in order to indicate whether the corresponding pentode P is in a conducting condition or a non-conducting condition.

In this ring circuit the anode A of each pentode P is connected to the anode voltage conductor PVC through the auxiliary winding $W_3$ of the operating transformer $T_1$ in the next section in sequence and through the primary windings *p* of the transformer $T_2$ in the last preceding section in sequence. More particularly, the anode A′ of the first pentode P′ is connected to the anode voltage conductor PVC through the auxiliary winding $W_3''$ of the second operating transformer $T_1''$ and through the primary winding P⁗ of the fourth restoring transformer $T_2''''$. Also the anode A″ of the second pentode P″ is connected to the anode voltage conductor PVC through the auxiliary winding $W_3'''$ of the third operating transformer $T_1'''$ and through the primary winding *p′* of the first restoring transformer $T_2'$. Also, the anode A‴ of the third pentode P‴ is connected to the anode voltage conductor PVC through the auxiliary winding $W_3''''$ of the fourth operating transformer $T_1''''$ and through the primary winding *p″* of the second restoring transformer $T_2''$. And also, the anode A⁗ of the fourth pentode P⁗ is connected to the anode voltage conductor PVC through the auxiliary winding $W_3'$ of the first operating transformer $T_1'$ and through the primary winding P‴ of the third restoring transformer $T_2'''$.

A pulse standardizer 30, shown only fragmentarily, of the type hereinbefore described and a zeroing circuit (not shown) of the type hereinbefore described, are associated with this ring circuit. The output pentode $P_7$ of the pulse standardizer 30 is connected to the anode voltage conductor PVC through the four primary windings $W_1$ of the operating transformer $T_1$ in series for applying pulses to the ring circuit.

*Ring circuit—operation*

In the normal operation of this ring circuit, one section operates at a time, and only the next section in sequence is prepared for operation and each time that a section operates, it restores the preceding section in sequence.

More particularly, considering the detailed operation of the ring circuit starting with a condition in which a zero count is indicated, in this condition the fourth section S⁗ is operating and the first, second and third sections S′, S″, S‴ are restored. Also, in this condition the cores M″, M‴, and M⁗ in the second, third and fourth operating transformers $T_1''$, $T_1'''$ and $T_1''''$ are negatively magnetized in condition 3, and by virtue of the anode current flowing through the auxiliary winding $W_1'$, of the first operating transformer $T_1'$, the core M′ of this transformer is positively magnetized in condition 4. And also in this condition glow lamp GL⁗ shines and the remaining glow lamps GL′, GL″, GL‴ are dark.

Thereafter, when the application of a pulse to the ring circuit from the pulse standardizer 30 is initiated, a unit current flows through the four primary windings $W_1$ of the operating transformers $T_1$. At this time the magnetization of the first operating core M′ reverses changing from condition 4 to condition 6 thereby applying a large negative pulse to the pentode P′ in the first section S′ and causing it to operate. The resultant unit current flowing from the anode A′ of the first pentode P′ through the auxiliary winding $W_3''$ of the second operating transformer $T_1''$ cooperates with the current flowing through the primary winding $W_1''$ of this transformer from the pulse standardizer 30 to change the magnetization of its core M″ from condition 3 to condition 2. Concurrently, the unit current flowing from the anode A′ of the first pentode P′ through the primary winding *p⁗* of the restoring transformer $T_2''''$ in the fourth section S⁗ restores the fourth section. When the fourth section S⁗ restores the unit current flowing to its anode A⁗ through the auxiliary winding $W_3'$ of the operating transformer $T_1'$ of the first section S′ and through the primary winding *p‴* of the restoring transformer $T_2'''$ of the third section S‴ terminates, causing the magnetization of the first operating core M′ to change from condition 6 to condition 1. Also, as a result of the initiation of the unit pulse applied to the ring circuit, the magnetization of the operating cores M''' and M'''' in the third and fourth sections S''' and S'''' change from condition 3 to condition 1.

Upon the termination of the first unit pulse current applied from the pulse standardizer 30, the magnetization of the second operating core M'' is reversed, changing from condition 2 to condition 4, by the influence of the current flowing through the auxiliary winding $W_3''$ of the second operating transformer $T_1''$ from the anode A' of the first pentode P'. At the same time, the cessation of current through the primary windings $W_1'$, $W_1'''$ and $W_1''''$ of the other operating transformers $T_1'$, $T_1'''$, and $T_1''''$ causes the magnetization of the cores M', M''', and M'''' thereof to change from condition 1 to condition 3. As a final result of the application of the first pulse to the ring circuit, the fourth section S'''' thereof which had previously been operating is restored and the first section S' thereof which had previously been restored is operating and the second and third sections S'' and S''' remain restored. This change is indicated by the darkening of the fourth glow lamp GL'''' and the lighting up of the first glow lamp GL'. Only the second section S'', in which the operating transformer core M'' is magnetized in condition 4, is prepared for operation by the next succeeding pulse.

Thereafter when a second pulse is applied to the ring circuit, the second glow lamp GL'' lights up and the first glow lamp GL' is darkened in the same manner. Similarly, when a third pulse is applied the second glow lamp GL'' darkens and the third lamp GL''' lights up. And likewise when a fourth pulse is applied the third glow lamp GL''' darkens and the fourth lamp GL'''' lights up, thus returning the circuit to its original state.

If it is desired to register counts which are multiples of the number of sections in the ring circuit described, a plurality of similar ring circuits are cascaded. For example, the primary windings of the operating transformer of the second ring circuit are connected in series between the anode voltage conductor PVC and the anode A'''' of the fourth pentode P'''' and in series with the auxiliary winding $W_3'$ of the first operating transformer $T_1'$ and the primary winding $p'''$ of the third restoring transformer $T_2'''$ the four primary windings of the second ring circuit being inserted at the point X. It is to be noted that the resultant arrangement is very similar to that previously described in Fig. 1, that in Fig. 1 being an example of a cascade arrangement of two ring circuits each having two sections.

*Ring circuit—Auxiliary circuit*

The various electrodes of the ring circuit are energized by means of a power supply 81 and a control circuit 34 including a bank of relays $L_1$, $L_2$ and $L_3$ in substantially the same manner as those of the first stage 10 of the counter of Fig. 1. The inter-connection between the pentodes P of the ring circuit and relays $L_1$, $L_2$, and $L_3$ are illustrated in Fig. 6, identical parts being indicated by identical legends to those used in Fig. 2. In this case the first pair of contacts $X_6$ of the third relay $L_3$ are omitted since this counter has only one stage. With this arrangement, the ring circuit may be de-energized and then re-energized and the condition before de-energization recalled by applying a series of four pulses thereto from the output 40 of the pulse standardizer 30 in accordance with the principles hereinbefore set forth. In the event that a plurality of cascaded ring circuits are utilized the control grids in the various stage are de-energized and re-energized sequentially, and also in the manner hereinbefore described.

In connection with the zeroing of the ring circuit a biasing network 100 is connected between the negative voltage conductor NVC and ground. This network 100 includes an upper resistor $R_{27}$ and a lower resistor $R_{28}$, the junction between which is connected to a first biasing conductor $BC_5$ which in turn is connected to the control grids CG', CG'', and CG''' of the first, second, and third pentodes P', P'', and P''' through the associated grid circuits, GC', GC'', and GC''' in order to apply a normal biasing voltage to said control grids. The control electrode CG'''' of the fourth pentode P'''' is connected through the associated grid control circuit GC'''' directly to a second biasing conductor $BC_6$ and thence through a normally open switch 102 to an intermediate point on the upper resistor $R_{27}$. A time delay network 105 including a resistor $R_{29}$ and a condenser $C_{13}$, is connected between the two biasing conductors $BC_3$ and $BC_4$. A condenser $C_{14}$ and a normally open switch 103 are arranged in parallel across the lower resistor $R_{28}$. A normally open pulsing switch 104 is connected to operate the pulse standardizer 30 in the same manner as the pulsing switch 74 of Fig. 2.

The three switches 102, 103, and 104 are ganged to close in the order named and to open in the reverse order. In utilizing this zeroing network, when these switches are depressed, closure of the first switch 102 applies a high negative bias to the control grid CG'''' of the fourth pentode P'''', operating it in the event that it is not already operating. Closure of the second switch 103 grounds the control electrodes CG', CG'', and CG''' of the first, second, and third pentodes P', P'', and P''' thereby restoring all of them if not already restored. Subsequent closure of the third switch 104 applies a unit current pulse to the primary windings $W_1$ of all of the operating transformers $T_1$. Thereafter when the switches are released, the pulsing switch 104 opens, then the second switch 103 opens, and then the first switch 102 opens with the net result that the ring circuit is in a condition corresponding to a zero count and is ready to count pulses. In this condition the fourth glow lamp GL'''' shines and the first, second and third glow lamps GL', GL'', and GL''' are dark. Also in this condition, the first operating core M' is positively magnetized in condition 4 and the remaining operating cores M'', M''' and M'''' are negatively magnetized in condition 3.

*Thyratron type counter—Construction*

Figure 7:
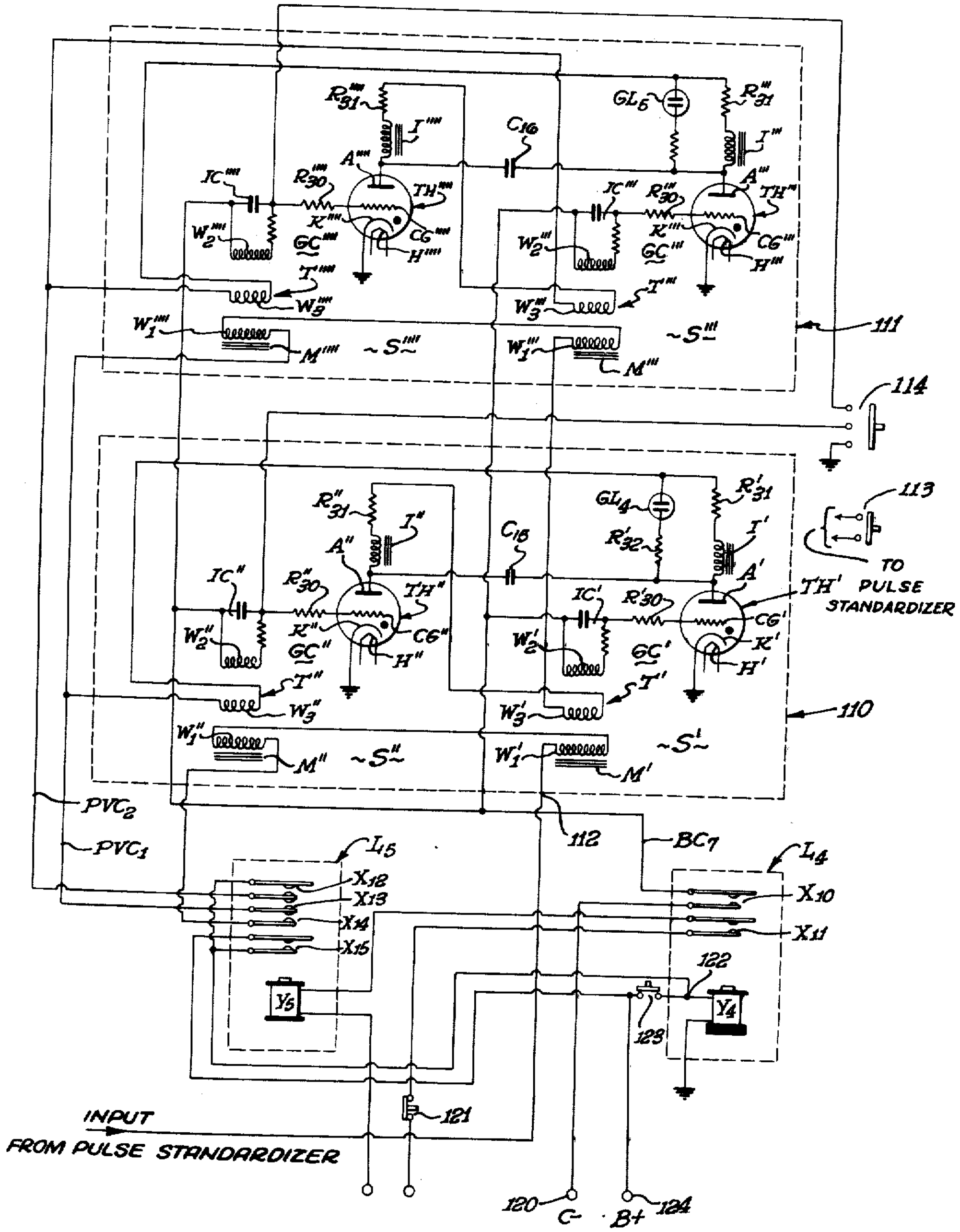
Fig. 7 is a wiring diagram of an electronic counter of the thyratron type, together with its associated auxiliary circuits embodying features of my invention.

Referring to Fig. 7 there is illustrated an embodiment of my invention comprising a scale-of-four counter utilizing thyratron tubes arranged in pairs in two cascaded stages. The first stage 110 includes first and second sections S' and S'' and the second stage 111 includes third and fourth sections S''' and S''''. As before, in the description of Fig. 1, similar elements in the respective sections are designated by the same letters to which superscripts ', '', ''', and '''' are affixed to indicate the section in which the elements are arranged.

Associated with each of the thyratrons TH is a grid control circuit GC which includes a three winding operating transformer T of the type hereinbefore described. In this instance the polarity of the secondary winding $W_2$ of each of the operating transformers T relative to the other two windings $W_1$ and $W_3$ thereof is the reverse of that used in Fig. 1, in order to enable the thyratrons TH to be operated by positive grid pulses. A current limiting resistor $R_{30}$ is connected between the control grid CG of each thyratron TH and the integrating circuit IC across the secondary winding $W_2$.

The anodes A' and A'' of the first and second thyratrons TH' and TH'' are coupled by a condenser $C_{15}$ which enables each operating thyratron to be restored when the other companion thyratron operates. The anode A' of the first thyratron TH' is connected to a first anode conductor $PVC_1$ through an inductor, or choke I', and a current limiting resistor $R_{31}'$ and the auxiliary winding $W_3''$ of the second transformer T''. The anode A'' of the second thyratron TH'' is connected to the same anode voltage conductor $PVC_1$ through a similar inductor I'' and current limiting resistor $R_{31}''$ through the first auxiliary winding $W_3'$ and through the third and fourth primary windings $W_1'''$ and $W_1''''$. A first glow lamp $GL_4$ and a current limiting resistor $R_{32}$ are connected between the anode A' of the first thyratron TH' and the first anode voltage conductor $PVC_1$ in parallel with choke I' and resistor $R_{31}'$.

In a like manner a condenser $C_{16}$ couples the anodes A''' and A'''' of the third and fourth thyratrons TH''' and TH''''. And the third thyratron is connected to a second anode voltage conductor $PVC_2$ through an inductor I''' and a current limiting resistor $R_{31}'''$ and the auxiliary winding $W_3''''$ of the fourth transformer T''''. Also the anode A'''' of the fourth thyratron TH'''' is connected to the second anode voltage conductor $PVC_2$ through an inductor I'''' and a current limiting resistor $R_{31}''''$ and the auxiliary winding $W_3'''$ of the third transformer T'''. A second glow lamp $GL_5$ and current limiting resistor $R_{33}$ are connected between the anole A''' of the third thyratron TH''' and the second anode voltage conductor $PVC_2$.

*Operation of thyratron type counter*

Considering the operation of this counting circuit, starting with a condition in which a zero count is indicated, it will be noted that in this condition the second and fourth thyratrons TH'' and TH'''' are conductng but the first and third thyratrons TH' and TH''' are not, and both of the glow tubes $GL_4$ and $GL_5$ are dark. When the first pulse is applied to the counter at the input 112 of the first stage 110, a unit current flows through the primary windings $W_1'$ and $W_1''$ of the first and second transformers T' and T'' momentarily. The resultant positive voltage generated in the first secondary winding $W_2'$ causes the first thyratron TH' to operate, igniting the first glow tube $GL_4$ and reducing the voltage at the anode A'' of the second thyratron TH'' to the point where this thyratron restores. When the latter thyratron TH'' restores, the current previously flowing through the third and fourth primary windings $W_1'''$ and $W_1''''$ terminates, inducing negative voltages in the secondary windings $W_2'''$ and $W_2''''$ of the third and fourth transformers T''' and T''''. These negative pulses have no effect upon the thyratrons TH''' and TH''''.

When a second pulse is applied to the input 112, the second section S'' operates, restoring the first section S' and operating the third section S'''. The operation of the third section S''' causes the second glow tube $GL_5$ to shine and the fourth section S'''' to restore. When a third pulse is applied to the input 112, the first section S' operates and the second section S'' restores, the third and fourth sections S''' and S'''' remaining unaffected. The illumination of both the first and second glow tubes $GL_4$ and $GL_5$ indicates the count of three. Upon the application of a fourth pulse, the second section S'' operates, restoring the first section S' and aperating the fourth section S''''. The operation of the fourth section S'''' restores the third section S'''. The resultant darkening of both the glow tubes $GL_4$ and $GL_5$ indicates that the counter has returned to the zero condition.

*Memory function of thyratron type counter*

To illustrate how count images impressed on the cores M permit this counter to be de-energized and then subsequently re-energized and the prior count recalled, consider a case in which the counter indicates a count of 2 prior to shut-down, with the second and third thyratrons TH'' and TH''' operating and the first and fourth thyratrons TH' and TH'''' restored.

In de-energizing the counter under these conditions, first any input pulse current which may then be flowing through the input 112 of the first stage 110 is terminated. Then the anode voltage is removed from the anodes A' and A'' of the first and second thyratrons TH' and TH'' by opening the circuit to the first anode voltage conductor $PVC_1$. This terminates the current previously flowing to the anode A'' of the second thyratron TH'' through the third and fourth primary windings $W_1'''$ and $W_1''''$. Then the anodes of the third and fourth sections S''' and S'''' are disconnected from the source of anode voltage by opening the circuit to the second anode voltage conductor $PVC_2$. Thereafter, normal bias voltage is removed from the grids CG of all thyratrons TH, and then, if desired, the power to the cathode heaters H associated with the grounded cathodes K is turned off.

In re-energizing the counter the voltages to the electrodes of the thyratrons are applied in the reverse order from which they were previously removed. Thus, first the heaters H are connected to the source of power, then the proper negative bias is applied to the grids CG and then the anode voltage is applied to the anodes A''' and A'''' of the third and fourth thyratrons TH''' and TH'''' and then to the anodes A' and A'' of the first and second thyratrons TH' and TH''. Upon completion of this sequence none of the thyratrons are conducting. When in this condition a count image is impressed upon the set of magnetic cores in a manner similar to that hereinbefore described and the counter is ready to recall the previous count by the application of four pulses to the input 112 of the first stage 110.

In order to zero this counter, a unit current is applied from the pulse standardizer (not shown) to the input 112 of the first stage 110 by closing a first switch such as indicated at 113, connected in the input circuit of the pulse standardizer in a manner comparable to the pulsing switch 74 in Fig. 2. Thereupon while these contacts are still closed the grid circuits of the second and fourth thyratrons TH'' and TH'''' are grounded by closing a second switch 114 corresponding in function to the grounding switch 75 in Fig. 2. These switches are opened in the reverse order, resulting in the operation of the second and fourth sections S'' and S'''' and the restoration of the first and third sections S' and S''' and magnetizing the cores M in such a way as to prepare the counter for counting.

*Thyratron type counter—Auxiliary circuit*

The proper sequential energization and de-energization of the various electrodes is preferably accomplished by means of two relays $L_4$ and $L_5$. The first relay $L_4$ is of the slow-to-restore type and comprises first and second pairs of contacts $X_{10}$ and $X_{11}$ which are normally open and which act in the order named when the relay operates and in the reverse order when it restores. The first pair of contacts $X_{10}$ are included in a circuit which connects the grids CG of the various thyratrons TH through biasing conductor $BC_7$ to a terminal 120 to which a normal negative bias voltage is applied. The second pair of contacts $X_{11}$ is included in series with a normally closed "off" switch 121 between the solenoid $Y_5$ of the second relay $L_5$ and the power mains. This circuit is preferably connected on the low side of the main power switch of the power supply from which various voltages are derived for the counter, namely the voltages for the bias terminal and the B+ terminal and the power for the heaters.

The second relay $L_5$ includes first, second, third and fourth normally open contacts $X_{12}$, $X_{13}$, $X_{14}$, and $X_{15}$ which act in the order named when the second relay operates and which act in the reverse order when this relay restores. The first and second pairs of contacts $X_{12}$ and $X_{13}$ are included in series with the second and first anode voltage conductors $PVC_2$ and $PVC_1$ respectively and a common point 122 between the solenoid $Y_4$ of the first relay $L_4$ and the normally open "on" button 123 connected between that solenoid $Y_4$ and the B+ terminal 124. The third pair of contacts $X_{14}$ is arranged in a circuit between this common point 122 and the output of the pulse standardizer in series with the primary windings $W_1'$ and $W_1''$ of the first and second transformers T' and T''.

The fourth pair of contacts $X_{15}$ is arranged in parallel with the "on" button 123 and serves to seal in the relay circuit when the contacts are closed.

In de-energizing the counter, the normally closed "off" button 123 is depressed breaking the circuit to the solenoid $Y_5$ of the second relay $L_5$. When this circuit is broken, the fourth pairs of contacts $X_{15}$ of the second relay $L_5$ open, breaking the circuit to the first solenoid $Y_4$. The third pair of contacts $X_{14}$ of the second relay $L_5$ thereupon open breaking the circuit connection between the pulse standardizer and the input 112 of the first stage 110 terminating any current that may then be flowing therethrough. Thereupon the second and first pairs of contacts $X_{13}$ and $X_{12}$ open in the sequence named removing anode voltage from the first and second thyratrons TH' and TH" and then from the third and fourth thyratrons TH‴ and TH''''. The first relay $L_4$ does not restore until all of the contacts in the second relay $L_5$ have opened. Upon restoration of the first relay $L_4$, its second pair of contacts $X_{11}$ opens, permitting the "off" button 121 to be released without affecting the operation of the circuit. Then the first pair of contacts $X_{10}$ of this relay $L_4$ open, removing bias from the grids CG of all the thyratrons TH.

A pulse standardizer of the type hereinbefore described is used for impressing pulses of standard magnitude upon the first stage 110 of this counter. In this instance however, the line including the resistor $R_{25}$ is omitted since a different relay control system is used in connection with this counter. Also a zeroing circuit of the general type hereinbefore described may be used in connection therewith suitable modifications being made to take into account the fact that the thyratrons are positive transconductance tubes. And also a power supply of the type hereinbefore described is used in connection with this counter, except that no provision need be made for the supply of a negative voltage, except as may be required for use as negative bias at terminal 120.

*Summary*

In view of the foregoing description of various applications of my invention to electronic counters, it will be apparent that I have provided a device which permits remembering the last prior condition of an electric discharge device for an indefinite period after the device is de-energized, and that I have also provided means for recalling the last prior condition of that electric discharge device after it is re-energized. Though my invention has been described with particular reference to relay means of the electric discharge type, which may be changed from an operated condition to a restored condition, and vice versa, while it is energized, it will be clear to those skilled in the art that my invention is equally applicable to other types of relay means which may be so changed while energized.

Also it is to be understood that while my invention has been described with reference to particular circuits utilizing elements having specific electrical constants, my invention is also applicable to circuits including elements having other electrical constants, the constants recited being presented for illustrative purposes only.

It is to be further understood that where reference is made in the above description to positive and negative values of different quantities, these terms are to be considered in their mutual relationship only, there being nothing absolute in them. This is particularly applicable in connection with the discussion of the magnetization of a core and the illustration thereof in Fig. 5.

Accordingly, it is to be understood that the apparatus herein described is susceptible of wide modification within the scope and spirit of my invention, the apparatus disclosed in detail being presented only for the purpose of illustrating one important type of application of my invention. It is therefore to be understood that my invention is not to be limited to the specific details and applications illustrated but only by the appended claims.

I claim:

1. In combination: an electric circuit comprising a plurality of relay sections, each relay section having an operated condition and a restored condition while said circuit is energized; a set of memory devices associated with the respective relay sections, each of said devices being operable between a pair of conditions; means for coordinately operating and restoring said sections while said circuit is energized and for coordinately actuating said memory devices in a related manner; means for de-energizing said circuit; and means controlled by the de-energization of said circuit for impressing upon said set of memory devices a pattern of conditions representative of the last previous set of conditions of said sections prior to de-energization.

2. Apparatus as defined in claim 1 and also comprising: means for re-energizing said circuit while maintaining said relay sections restored; and means for reactuating said set of memory devices for returning the respective relay sections to the same conditions that they were in last prior to de-energization.

3. In combination: an electric circuit comprising a plurality of relay sections, each relay section having an operated condition and a restored condition while said circuit is energized; a set of cores composed of a material having appreciable magnetic retentivity associated with the respective relay sections; means for coordinately operating and restoring said sections while said circuit is energized and for coordinately magnetizing said cores in a related manner; means for de-energizing said circuit; and means controlled by the de-energization of said circuit for impressing upon said set of cores a magnetization pattern representative of the last previous set of conditions of said sections prior to de-energization.

4. In combination: an electric circuit comprising a plurality of relay sections, each relay section having an operated condition and a restored condition while said circuit is energized; a set of cores composed of a material having appreciable magnetic retentivity associated with the respective relay sections, each said core being magnetizable in opposite directions; means controlled by the operation of each section for positively magnetizing the core associated with another section; common means for negatively magnetizing all of said cores; means controlled by a change in magnetization of each core in a negative direction for operating its associated relay section; and means for deenergizing said circuit whereby all of said relay sections become restored and a megnetization pattern representative of the last previous set of conditions of said sections prior to de-energization is impressed upon said set of cores.

5. In an electric circuit, the combination which comprises: relay means having an operated condition and a restored condition and including a control circuit; a core composed of a material having appreciable magnetic retentivity; a coil in said control circuit and linked by flux in said core; said control circuit operating said relay means upon induction of a potential in said coil only in response to a relatively large negative flux change occurring in said core; means for applying a positive magneization force to said core to prepare it for producing a large negative flux change; and means for applying a negative magnetization force to said core whereby a relatively large negative flux change occurs therein only when said core is so prepared.

6. In an electric circuit, the combination which comprises: relay means having an operated condition and a restored condition and including a control circuit; a core composed of a material having appreciable magnetic retentivity; a coil in said control circuit and linked by flux in said core; said control circuit operating said relay means upon induction of a potential in said coil only in response to a relatively large negative flux change occurring in said core; means for applying a relatively small positive magnetization force to said core whereby said core is positively magnetized; means for applying a relatively large negative magnetization force to said core while said positive magnetization force is applied thereto whereby a relatively large negative flux change occurs in said core to cause said core to become negatively magnetized and said relay means to operate; means controlled by operation of said relay means for terminating said positive magnetization force; and means for terminating the application of said negative magnetization force whereby said core remains negatively magnetized.

7. In an electric circuit, the combination which comprises: relay means having an operated condition and a restored condition and including a control circuit; a core composed of material having appreciable magnetic retentivity; a coil in said control circuit and linked by flux in said core; said control circuit operating said relay means upon induction of a potential in said coil only in response to a relatively large negative flux change occurring in said core; means for applying a relatively large negative magnetization force to said core while said core is positively magnetized whereby a relatively large negative flux change occurs in said core and said relay means operates; means for terminating the application of said negative magnetization force whereby said core remains negatively magnetized and said relay means remains operated; a control device; means controlled by said device for applying a relatively small positive magnetization force to said core while so remaining negatively magnetized whereby said core becomes positively magnetized; and means also controlled by said device for restoring said relay means.

8. In an electric circuit, the combination which comprises: relay means having an operated condition and a restored condition and including a control circuit; a core composed of a material having appreciable magnetic retentivity; a coil in said control circuit and linked by flux in said core; said control circuit operating said relay means upon induction of a potential in said coil only in response to a relatively large negative flux change occurring in said core; means for applying a relatively large negative magnetization force to said core while said core is negatively magnetized whereby only a relatively small negative flux change appears in said core; a control device; means controlled by said device for applying a relatively small positive magnetization force to said core; means also controlled by said device for restoring said relay means; and means for terminating said negative magnetization force while said positive magnetization force is applied to said core whereby said core becomes positively magnetized.

9. In an electric circuit, the combination which comprises: relay means having an operated condition and a restored condition and including a control circuit; a core composed of a material having appreciable magnetic retentivity; a coil in said control circuit and linked by flux in said core; said control circuit operating said relay means upon induction of a potential in said coil only when a relatively large negative flux change occurs in said core; first magnetization means for repeatedly applying and terminating a relatively large negative magnetization force to said core; and second magnetization means for applying a relatively small positive magnetization force to said core while said relatively large negative magnetization force is applied by said first magnetization means and for maintaining such relatively small positive magnetization force after termination of said relatively large negative magnetization force to magnetize said core positively, whereby application of a succeeding relatively large negative magnetization force to said core by said first magnetization means will produce a relatively large negative flux change in said core.

10. In an electric circuit, the combination which comprises:

relay means having an operated condition and a restored condition and including a control circuit;

a core composed of a material having appreciable magnetic retentivity;

a coil in said control circuit and linked by flux in said core; said control circuit operating said relay means upon induction of a potential in said coil only when a relatively large negative flux change occurs in said core;

means coupled to said core for successively applying first and second relatively large negative magnetization forces to said core;

preparing means coupled to said core for applying a relatively small positive magnetization force to said core;

restoring means coupled to said relay means;

common control means for actuating said preparing means and said restoring means between the application of said first and second magnetizing forces to said core whereby said relay means is restored and said core is positively magnetized in preparation for producing a relatively large negative flux change upon application of the second negative magnetization force to said core thereby reoperating said relay means.

11. In an electric circuit, the combination which comprises:

relay means having an operated condition and a restored condition and including a control circuit;

a core composed of a magnetic material having appreciable retentivity;

first means for applying a negative magnetization force to said core to magnetize it relatively negatively;

second means for applying a positive magnetization force to said core to magnetize it relatively positively;

whereby application of a negative magnetization force to said core by said first means produces a relatively large negative flux change therein if said core is magnetized relatively positively, and a relatively small negative flux change therein if said core is magnetized relatively negatively at the time said negative magnetization force is applied;

a coil in said control circuit and linked by flux in said core; said control circuit operating said relay means upon induction of a potential in said coil in response to a relatively large negative flux change in said core;

and means for restoring said relay means.

12. In an electric circuit, the combination which comprises:

relay means having an operated condition and a restored condition and including a control circuit;

a core composed of a material having appreciable magnetic retentivity;

a coil in said control circuit and linked by flux in said core;

said control circuit operating said relay means upon induction of a potential in said coil only when a relatively large negative flux change occurs in said core;

control means coupled to said core and having an operated condition and a restored condition;

means controlled by operation of said control means for applying a relatively small positive magnetization force to said core;

means for applying a relatively large negative magnetization force to said core while said control means is operated whereby a relatively large negative flux change occurs therein thereby operating said relay means;

means controlled by operation of said relay means for restoring said control means thereby terminating said relatively small positive magnetization force;

and means for repeatedly operating and restoring said control means.

13. In an electric circuit, the combination which comprises:

relay means having an operated condition and a restored condition, said relay means being operated only when a relatively large negative voltage is applied thereto and being restored only when a relatively large positive voltage is applied thereto;

a core composed of a magnetic material having appreciable magnetic retentivity;

means coupling said core with said relay means, said relay means being operated only when a relatively large negative voltage is applied thereto and being restored only when a relatively large positive voltage is applied thereto;

control means having an operated condition and a restored condition;

means controlled by operation of said control means for applying a relatively large positive voltage to said relay mean whereby said relay means is restored;

means also controlled by operation of said control means for applying a positive magnetization force to said core;

means for subsequently applying a negative magnetization force to said core whereby a relatively large negative flux change occurs therein;

means responsive to a relatively large negative flux change in said core for applying a relatively large negative voltage to said relay means whereby said relay means is operated;

and means for selectively operating and restoring said control means.

14. In an electric circuit, the combination which comprises:

relay means having an operated condition and a restored condition, said relay means being operated only when a relatively large negative voltage is applied thereto and being restored only when a relatively large positive voltage is applied thereto;

a core composed of a magnetic material having appreciable retentivity;

control means having an operated condition and a restored condition;

means controlled by operation of said control means for applying a relatively large positive voltage to said relay means whereby said relay means is restored;

means also controlled by operation of said control means for applying a positive magnetization force to said core;

means for subsequently applying a negative magnetization force to said core whereby a relatively large negative flux change occurs therein;

means responsive to a relatively large negative flux change in said core for applying a relatively large negative voltage to said relay means whereby said relay means is operated;

means controlled by operation of said relay means for restoring said control means;

and means for operating said control means.

15. In an electric circuit, the combination which comprises:

a plurality of relay means arranged in a continuous sequence in a ring circuit, each relay means having an operated condition and a restored condition;

a plurality of cores associated respectively with said relay means, each core being composed of a magnetic material having appreciable retentivity and having a prepared magnetic condition and an operated magnetic condition;

means controlled by operation of each of said relay means for restoring another of said relay means;

means also controlled by the operation of each of said relay means for preparing the core of another of said relay means;

common means for applying a magnetization force to all of said cores whereby each core in prepared condition operates and each core in operated condition remains operated;

and means controlled by the operation of each core for operating the relay means associated therewith.

16. In an electric circuit, the combination which comprises:

a plurality of relay means arranged in a continuous sequence in a ring circuit, each relay means having an operated condition and a restored condition;

a plurality of cores associated respectively with said relay means, each core being composed of a magnetic material having appreciable retentivity and having a prepared magnetic condition and an operated magnetic condition;

means controlled by the operation of each of said relay means for restoring the next prior relay means in the ring circuit;

means also controlled by the operation of each of said relay means for preparing the core associated with the next following relay means in the ring circuit;

common means for applying a magnetization force to all of said cores whereby each core in prepared condition operates and each core in operated condition remains operated;

and means controlled by the operation of each core for operating the relay means associated therewith.

17. In an electric circuit, the combination which comprises:

first and second relay means, each having an operated condition and a restored condition;

first and second cores associated respectively with said first and second relay means each core being composed of a magnetic material having appreciable retentivity and having a prepared magnetic condition and an operated condition;

means controlled by the operation of each of said relay means for restoring the other of said relay means;

means also controlled by the operation of each relay means for preparing the core associated with the other relay means;

common means for applying a magnetization force to both of said cores whereby the prepared core operates and the operated core remains operated;

and means controlled by the operation of each core for operating the relay means associated therewith.

18. In an electric circuit, the combination which comprises:

first and second relay means, each having an operated condition and a restored condition;

first and second cores associated respectively with said first and second relay means, each core being composed of a magnetic material having appreciable retentivity;

means controlled in response to operation of each of said relay means for restoring the other relay means;

means also controlled by the operation of each of said relay means for positively magnetizing the core associated with the other relay means;

means for applying a negative magnetization force to both of said cores whereby the positively magnetized core becomes negatively magnetized and a negatively magnetized core remains so;

and means controlled by negative magnetization of a positively magnetized core for operating the relay means associated therewith.

19. In combination:

an electric circuit including relay means having an operated condition and a restored condition while energized;

a core composed of a material having appreciable magnetic retentivity associated with said relay means;

control means for de-energizing said circuit;

and means governed by the de-energization of said circuit for negatively magnetizing said core when said relay means was in its operated condition just prior to de-energization, and for positively magnetizing said core when said relay means was in its restored condition just prior to de-energization.

20. In an electric circuit, the combination comprising:

relay means having an operated condition and a restored condition while energized and a restored condition while de-energized;
a core composed of a material having appreciable magnetic retentivity associated therewith;
means for de-energizing said relay means;
means for negatively or positively magnetizing said core according to whether said relay means was in its operated condition or its restored condition just prior to de-energization;
means for re-energizing said relay means while retaining it in its restored condition;
and means cooperating with said core for placing said relay means in an operated or a restored condition according to the polarity of the magnetization impressed upon said core in the de-energization process whereby said relay means is returned to the condition it was in just prior to de-energization.

21. In an electric circuit, the combination comprising:
a plurality of inter-connected relay means, each having an operated condition and a restored condition;
a plurality of cores associated respectively with said relay means, each core being composed of a material having appreciable magnetic retentivity;
means for coordinately operating and restoring said relay means while energized;
means for de-energizing said relay means;
and means controlled by de-energization of said relay means for negatively or positively magnetizing each core according to whether the corresponding relay means was in its operated condition or its restored condition just prior to de-energization.

22. In an electric circuit, the combination comprising:
a plurality of inter-connected relay means, each having an operated condition and a restored condition;
a plurality of cores associated respectively with said relay means, each core being composed of a material having appreciable magnetic retentivity;
means controlled by the operation of each relay means for restoring another relay means;
means also controlled by the operation of each relay means for positively magnetizing a core associated with a restored relay means;
common means for negatively magnetizing said cores whereby positively magnetized cores become negatively magnetized; means controlled in response to a change in magnetization of a core from a positive value to a negative value for operating a restored relay means associated therewith;
and means for de-energizing said relay means whereby all relay means are restored and each core remains negatively or positively magnetized according to whether the associated relay means was in its operated condition or its restored condition just prior to de-energization.

23. In an electric circuit, the combination comprising:
a plurality of inter-connected relay means, each having an operated condition and a restored condition;
a plurality of cores associated respectively with said relay means, each core being composed of a material having appreciable magnetic retentivity;
means for coordinately operating and restoring said relay means while energized;
means for de-energizing said relay means whereby all relay means are restored and each core remains negatively or positively magnetized according to whether the corresponding relay means was in its operated condition or its restored condition just prior to de-energizing;
means for re-energizing said relay means while retaining all of them in a restored condition;
and means for applying a series of magnetizing forces to said cores whereby the conditions of the respective relay means last prior to de-energization are recalled.

24. In an electric circuit, the combination comprising:
a plurality of inter-connected relay means, each having an operated condition and a restored condition;
a plurality of cores associated respectively with said relay means, each core being composed of a material having appreciable magnetic retentivity;
means controlled by the operation of each relay means for restoring another relay means;
means also controlled by the operation of each relay means for positively magnetizing a core associated with a restored relay means;
common means for negatively magnetizing said cores whereby positively magnetized cores become negatively magnetized;
means controlled by a change in magnetization of a core from a positive value to a negative value for operating a restored relay means associated therewith;
means for de-energizing said relay means whereby all relay means are restored and each core remains negatively or positively magnetized according to whether the corresponding relay means was in its operated condition or its restored condition just prior to de-energizing;
means for re-energizing said relay means while retaining all of them in restored condition;
and means for applying a series of magnetizing forces to said cores whereby the conditions of the respective relay means last prior to de-energization are recalled.

25. In an electric circuit, the combination which comprises:
a plurality of circuit stages arranged in sequence, each circuit stage comprising a plurality of relay sections including an output section, each section having an operated condition and a restored condition;
a plurality of cores associated with the respective relay sections, each core being composed of a material having appreciable magnetic retentivity;
common means for applying negative magnetizing forces to all of the cores in the first stage whereby any positively magnetized core therein becomes negatively magnetized;
means controlled by the operation of each section for restoring another relay section in the same stage;
means also controlled by operation of each relay section for positively magnetizing the core associated with said another relay section;
means controlled by operation of the output section of each stage for applying a negative magnetization force to all the cores in the next following stage in sequence whereby a positively magnetized core becomes negatively magnetized;
means controlled by a change in magnetization of a core from a positive value to a negative value for operating the associated relay section in that stage;
and means for de-energizing all the relay sections in each stage in the sequence in which the stages are arranged to restore all relay means in each stage prior to the de-energization of relay sections in the following stages whereby each core that was positively magnetized previous to such de-energization remains positively magnetized and each core that was negatively magnetized prior to such de-energization remains negatively magnetized.

26. In an electric circuit, the combination as set forth in claim 25 and also comprising:
means for re-energizing said relay sections while retaining them in restored condition;
and recall means for applying a series of negative magnetization forces to said cores after re-energizing said relay sections whereby the condition of each relay section just prior to de-energization is recalled.

27. In an electric circuit, the combination as set forth in claim 25 and also comprising:
means for re-energizing said relay sections while retaining the min restored condition;

and recall means for applying a series of negative magnetization forces to the cores in the first stage after re-energizing said relay sections whereby the condition of each relay section just prior to de-energization is recalled.

28. In an electric circuit, the combination which comprises:
a plurality of circuit stages arranged in sequence, each circuit stage comprising a plurality of relay means including an output section arranged in a ring circuit, each section having an operated condition and a restored condition;
a plurality of cores associated with the respective relay means, each core being composed of a material having appreciable magnetic retentivity;
means controlled by the operation of each relay means for restoring the next prior relay means in the ring circuit;
means also controlled by the operation of each relay means for preparing the core associated with the next following relay means in the ring circuit;
a current source;
means for actuating said current source;
means coupling said current source with said cores whereby each core in prepared condition operates and each core in operated condition remains operated;
means controlled by the operation of each prepared core for operating the relay means associated therewith;
and means for de-energizing the current source and then the ring circuit whereby each core associated with each relay means last previously restored remains positively magnetized and each core associated with each relay means last previously operated remains negatively magnetized.

29. In an electric circuit, the combination as set forth in claim 28 and also comprising:
means for re-energizing said relay means while retaining them in restored condition and then re-energizing said current source;
and recall means for reactuating said current source whereby the condition of each relay means just prior to de-energization is recalled.

30. In an electronic circuit, the combination which comprises:
means including an electric discharge device having a control electrode and adapted to operate from one stable condition to another in response to a voltage change exceeding a predetermined amount on said control electrode;
a transformer having a core composed of a material having appreciable magnetic retentivity, said transformer having a primary winding and a secondary winding;
means connecting said secondary winding to said control electrode for applying thereto a potential exceeding said predetermined amount in response to a reversal of magnetization of said core;
means for magnetizing said core in one direction;
and means for magnetizing said core in the opposite direction.

31. In an electronic circuit, the combination as in claim 30 and also comprising:
auxiliary means for restoring said electric discharge device to said one stable condition.

32. In an electronic circuit, the combination which comprises:
means including an electric discharge device having a control electrode and adapted to operate from one stable condition to another in response to a voltage change exceeding a predetermined amount on said control electrode;
a transformer having a core composed of a material having appreciable magnetic retentivity, said transformer having a primary winding, a secondary winding, and a tertiary winding;
first means for applying a current to said tertiary winding to produce a relatively small magnetizing force in one direction in said core;
second means for applying a current to said primary winding to produce a relatively large magnetizing force in the opposite direction in said core;
means connecting said secondary winding to said control electrode for applying thereto a potential exceeding said predetermined amount in response to a reversal of the magnetizing force in said core from said one direction to said opposite direction;
and control means for actuating said first means and said second means.

33. In an electronic circuit, the combination as set forth in claim 32, wherein said control means is adapted to actuate said first means and said second means in the order named; and said combination also comprising:
auxiliary means for restoring said electric discharge device to said one stable condition.

34. In combination:
an electric circuit including an electric discharge device having a control electrode, said circuit being adapted to operate from a first condition to a second condition only when a negative potential change exceeding a first predetermined value occurs at said electrode and to restore from said second condition to said first condition only when a positive potential change exceeding a second predetermined value occurs at said electrode;
a transformer having a core composed of a material having appreciable magnetic retentivity, said transformer having a primary winding and a secondary winding;
means for applying to said control electrode a positive potential change exceeding said second predetermined value whereby said electrode discharge device is restored;
means for magnetizing said core in one direction;
means for applying a current pulse to said primary winding whereby said core is magnetized in the opposite direction;
and means connecting said secondary winding to said control electrode whereby a negative potential change exceeding said first predetermined value is applied to said control electrode, only when the magnetization of said core is changed from said one direction to said opposite direction.

35. In combination:
an electric circuit including an electric discharge device having a control electrode, said circuit being adapted to operate from a first condition to a second condition only when a negative potential change exceeding a first predetermined value occurs at said electrode and to restore from said second condition to said first condition only when a positive potential change exceeding a second predetermined value occurs at said electrode;
a transformer having a core composed of a material having appreciable magnetic retentivity, said transformer having a primary winding and a secondary winding;
a control device;
means controlled by said device for applying to said control electrode a positive potential change exceeding said second predetermined value whereby said electric discharge device is restored;
means also controlled by said device for magnetizing said core in one direction;
means for applying a current pulse to said primary winding whereby said core is magnetized in the opposite direction;
and means connecting said secondary winding to said control electrode whereby a negative potential change exceeding said first predetermined value is applied to said control electrode only when the magnetization of said core is changed from said one direction to said opposite direction.

36. In combination:
an electric circuit including an electric discharge device having a control electrode, said circuit being adapted to operate from a first condition to a second condition only when a negative potential change exceeding a first predetermined value occurs at said electrode and to restore from said second condition to said first condition only when a positive potential change exceeding a second predetermined value occurs at said electrode;
a first transformer having a primary winding and a secondary winding;
a second transformer having a core composed of a material having appreciable magnetic retentivity, and also having a primary winding and a secondary winding and a tertiary winding;
means connecting the secondary winding of said first transformer to said control electrode;
means for applying a current pulse to the primary winding of said first transformer whereby a positive potential change exceeding said second predetermined value occurs at said control electrode thereby restoring said circuit;
means for applying a current pulse to the tertiary winding of said second transformer whereby a magnetizing force is applied to said core in one direction;
means for applying a current pulse to the primary winding of said second transformer whereby a magnetizing force is applied to said core in an opposite direction;
and means connecting the secondary winding of said second transformer to said control electrode whereby a negative potential change exceeding said first predetermined value occurs at said control electrode in response to a change in the magnetizing force in said core from said one direction to said opposite direction.

37. In combination:
an electric circuit including an electric discharge device having a control electrode adapted to operate from a first condition to a second condition and to restore from said second condition to said first condition;
a first transformer having a primary winding and a secondary winding;
a second transformer having a core composed of a material having appreciable magnetic retentivity, and also having a primary winding and a secondary winding and a tertiary winding;
means connecting said secondary windings to said control electrode;
a current source connected to the primary winding of said first transformer and the tertiary winding of said second transformer;
means for switching said current source on temporarily whereby said electric discharge device is restored and a positive magnetization force is applied to said core;
and means for applying a current pulse to the primary winding of said second transformer subsequent to the application of said positive magnetization force to said core whereby a negative magnetization force is applied to said core thereby operating said electric discharge device.

38. In combination:
an electric circuit comprising two electric discharge devices each having a control electrode and an anode and each being adapted to operate from a first condition to a second condition in response to a negative voltage change exceeding a first predetermined value at said control electrode and to restore from said second condition to said first condition in response to a voltage change exceeding a second predetermined value at said control electrode;
a first pair of transformers associated respectively with said discharge devices, and each having a primary winding and a secondary winding;
a second pair of transformers associated respectively with said two electric discharge devices, each of the latter transformers having a core composed of a material having an appreciable magnetic retentivity and also having a primary winding and a secondary winding and a tertiary winding;
the secondary windings of the first pair of transformers and the secondary windings of the second pair of transformers being connected to the control electrodes of transformers being connected to the control electrodes of the respective associated discharge devices and the primary winding of the first transformer and the tertiary winding of the second transformer associated with each discharge device being connected to the anode of the other discharge device;
and means for applying current pulses to the primary windings of said second pair of transformers.

39. In combination:
an electric circuit comprising a plurality of at least three electric discharge devices arranged in a ring circuit, each of said devices having a control electrode and an anode and each being adapted to operate from a first condition to a second condition in response to a negative voltage change exceeding a first predetermined value at said control electrode and to restore from said second condition to said first condition in response to a voltage change exceeding a second predetermined value at said control electrode;
a first plurality of transformers associated respectively with said discharge devices, and each having a primary winding and a secondary winding;
a second plurality of transformers associated respectively with said electric discharge devices, each of the latter transformers having a core composed of a material having an appreciable magnetic retentivity and also having a primary winding and a secondary winding and a tertiary winding; the secondary windings of the first plurality of transformers and the secondary windings of the second plurality of transformers being connected to the control electrodes of the respective associated discharge devices, the primary winding of each of the first plurality of transformers associated with each discharge device being connected to the anode of another discharge device, and the tertiary winding of each of the second plurality of transformers associated with each discharge device being connected to the anode of still another discharge device;
and means for applying current pulses to the primary windings of said second plurality of transformers.

40. In an electric circuit; a plurality of relay sections, each relay section having an operated condition and a restored condition; a plurality of cores composed of a material having appreciable magnetic retentivity associated with the respective relay sections, each said core being magnetizable in opposite directions; means controlled by the operation of each section for positively magnetizing the core associated with another section; common means for negatively magnetizing all of said cores; and means controlled by a change in magnetization of each core in a negative direction for operating its associated relay section.

41. In an electric circuit, the combination which comprises: a core composed of a material having appreciable magnetic retentivity, said core having a winding thereon; circuit means having an input and an output and adapted to produce current of a predetermined sign only at its output, said current being produced in response to the application of a voltage of predetermined polarity applied to its input, said input being connected to said winding, means for magentizing said core in one direction, and means for magnetizing said core in the opposite direction, whereby a voltage of said polarity is produced in said winding in response to a change in the magnetization of said core from said one direction to said opposite direction.

42. In an electric circuit, the combination which comprises: a transformer having a core composed of a material having appreciable magnetic retentivity, said transformer having a primary winding, a secondary winding, and an auxiliary winding, circuit means having an input and an output and adapted to produce current of predetermined sign only at its output, said current being produced in response to application of a voltage of predetermined polarity applied to its input, said input being connected to said secondary winding, first means for applying a current to said auxiliary winding to produce a magnetizing force in one direction in said core, and second means for applying a current to said primary winding to produce a magnetizing force in the opposite direction in said core whereby a voltage of said polarity applied is produced in said secondary winding in response to a change in the magnetization of said core from said one direction to said opposite direction.

43. In an electric circuit: a core composed of a material having appreciable magnetic retentivity, first, second, and third windings linked with flux in said core, means for applying a current pulse to said first winding to magnetize said core in one direction, means for applying a current pulse to said second winding to magnetize said core in the opposite direction, and means operatively connected to said third winding and selectively operable between a first stable condition and a second stable condition, said last mentioned means being controlled by a voltage induced in said third winding by a reversal in magnetization of said core from one of said directions to the other to change from one of said stable conditions to the other.

44. In an electric circuit: a core composed of a material having appreciable magnetic retentivity, first, second, and third windings linked with flux in said core, means for applying a current pulse to said first winding to change the magnetization of said core in one direction, means for applying a current pulse to said second winding to change the magnetization of said core in the opposite direction, voltages of a predetermined polarity being induced in said third coil by a change in magnetization of said core in only one of said directions, means operatively connected to said third winding and selectively operable between a first stable condition and a second stable condition, said last mentioned means being controlled to change from said first stable condition to said second stable condition by such a voltage of said polarity, and means for restoring said last mentioned means from said second condition to said first condition.

45. In an electric circuit: first and second cores, each core being composed of a magnetic material having appreciable retentivity, the magnetization of each core being adapted to be changed positively by a positive magnetization force and negatively by a negative magnetization force, means for applying a positive magnetization force to said first core to change its magnetization positively, means for applying a negative magnetization force to said first core to change its magnetization negatively, means controlled by a negative change in flux in said first core for applying a positive magnetization force to said second core whereby the magnetization of said second core is positively changed, means for applying a negative magnetization force, to said second core to change its magnetization negatively, and means selectively operable between a first stable condition and a second stable condition, said last mentioned means being controlled to change from one stable condition to the other by a change in magnetization of said second core.

46. In an electric circuit: first and second cores, each core being composed of a magnetic material having appreciable retentivity, the magnetization of each core being adapted to be changed positively by a positive magnetization force and negatively by a negative magnetization force, means for applying a positive magnetization force to said first core to change its magnetization positively, means for applying a negative magnetization force to said first core to change its magnetization negatively, means controlled by a negative change in flux in said first core for applying a positive magnetization force to said second core to change the magnetization of said second core positively, means for applying a negative magnetization force to said second core to change its magnetization negatively; means selectively operable between a first stable condition and a second stable condition, said last mentioned means being controlled to change from said first stable condition to said second stable condition by a change in magnetization of said second core of one sign but not of the other, and means for restoring said last mentioned means from said second condition to said first condition.

47. In an electric circuit: first and second cores, each core being composed of a magnetic material having appreciable retentivity, the magnetization of each core being adapted to be changed positively by a positive magnetization force and negatively by a negative magnetization force, first and second primary windings linked by the flux in said first and second cores respectively, first and second secondary windings linked by the flux in said first and second cores respectively, first and second auxiliary windings linked by the flux in said first and second cores respectively, said first secondary winding being so linked to said first core that a negative change in flux in said first core induces a voltage of predetermined polarity in said first secondary winding, said second auxiliary winding being so linked with said second core that current flowing in a predetermined direction in said second auxiliary winding causes a positive magnetization force to be applied to said second core, circuit means having an input supplied by said first secondary winding and an output supplying said second auxiliary winding, said circuit means having a unidirectionally conductive device so connected between said input and said output that a voltage of said predetermined polarity applied to said input causes a current to flow in said predetermined direction in said second auxiliary winding whereby a positive magnetization force is applied to said second core, means for applying current pulses to each primary winding to apply negative magnetization forces to the corresponding core linked therewith whereby the magnetization of said corresponding core is changed negatively, means for applying a current pulse to said first auxiliary winding to apply a positive magnetization force to said first core where said first core becomes positively magnetized, means connected to said second secondary winding selectively operable between a first condition and a second condition, said last mentioned means being controlled by a negative flux change in said second core to change from said first condition to said second condition, and means for restoring said last mentioned means from said second condition to said first condition.

48. In an electric circuit, the combination of: a plurality of at least three cores arranged in sequence in a ring circuit, each core being composed of a magnetic material having appreciable retentivity, each core being adapted to be magnetized positively by a positive magnetization force and negatively by a negative magnetization force, means for applying negative magnetization forces to each of said cores to magnetize said each core negatively if not already so magnetized, and a plurality of coupling means corresponding to each of said cores, each of said coupling means being controlled by a negative change in flux in the corresponding core to apply a positive magnetization force to the next following core in sequence whereby said next following core becomes positively magnetized.

49. In an electric circuit, the combination of: a plurality of at least three cores arranged in sequence in a ring circuit, each core being composed of a magnetic material having appreciable retentivity, each core being adapted to be magnetized positively by a positive magnetization force and negatively by a negative magnetization force, means for applying negative magnetization forces to each of said cores to magnetize said each core negatively if not already so magnetized, a plurality of coupling means corresponding to each of said cores, each of said coupling means being controlled by a negative change in flux in the corresponding core to apply a positive magnetization force to the next following core in sequence whereby said next following core becomes positively magnetized, and means selectively operable between a first condition and a second condition, said last mentioned means being operatively coupled to one of said cores to change from one condition to the other in response to a change of one sign but not to a change of the other sign in the magnetization of one of said cores.

50. In an electric circuit, the combination of: a plurality of at least three cores arranged in sequence in a ring circuit, each core being composed of a magnetic material having appreciable retentivity, each core being adapted to be magnetized positively by a positive magnetization force and negatively by a negative magnetization force, a corresponding plurality of primary windings linked by the flux in the respective cores, a corresponding plurality of secondary windings linked by the flux in the respective cores, a corresponding plurality of auxiliary windings linked by the flux in the respective cores, each said secondary winding being so linked to the core corresponding therewith that a negative change in flux in said corresponding core induces a voltage of predetermined polarity in the secondary winding linked therewith, each said auxiliary winding being so linked with the core corresponding therewith that current flowing in a predetermined direction in said each auxiliary winding causes a positive magnetization force to be applied to said last mentioned corresponding core, a corresponding plurality of circuit means, each connected between a corresponding pair of adjacent cores in the ring, each said circuit means having an input supplied by the secondary winding corresponding with the next preceding core and an output feeding the auxiliary winding corresponding with the next following core, each said circuit means comprising a unidirectionally conductive device so connected between the input and the output thereof that a voltage of said predetermined polarity applied to the input of each said circuit means causes a current to flow in said predetermined direction in the auxiliary winding at the output of each said circuit means whereby a positive magnetization force is applied to the corresponding next following core, and means for applying current pulses to said primary windings to apply negative magnetization forces to the respective corresponding cores whereby each said corresponding core becomes negatively magnetized if not already so magnetized.

51. In an electric circuit, the combination which comprises: relay means having an operated condition and a restored condition and including a control circuit, a core composed of a material having appreciable magnetic retentivity, a coil in said control circuit and linked by flux in said core, said control circuit operating said relay means upon induction of a potential in said coil only in response to a relatively large negative flux change occurring in said core, a first source of direct current adapted to apply a positive magnetization force to said core to prepare it for producing a large negative flux change, means for energizing and de-energizing said first current source whereby said first current source operates to produce said flux change when energized, a second source of direct current adapted to apply a negative magnetization force to said core, and means for energizing and de-energizing said second current source, whereby a relatively large negative flux change occurs in said core only if said core has been so prepared.

52. In an electronic circuit, the combination which comprises: a core composed of a material having appreciable magnetic retentivity, said core having a winding thereon, circuit means having an input and an output and adapted to produce current of predetermined polarity at its output in response to the application of a voltage of predetermined sign applied to its input, a first magnetizing means including a first source of unidirectional current, means for operating and restoring said first magnetizing means, said core being magnetized in one direction by operation of said first magnetizing means, second magnetizing means including a second source of unidirectional current, and means for operating and restoring said second magnetizing means, said core being magnetized in the opposite direction upon operation of said second magnetizing means, whereby a voltage of said sign is produced in said winding in response to a change in the magnetization of said core from said one direction to said opposite direction.

53. In an electronic circuit, the combination which comprises: a core composed of a material having appreciable magnetic retentivity, said core having a winding thereon, circuit means having an input and an output and adapted to produce current of predetermined polarity at its output in response to the application of a voltage of predetermined sign applied to its input, said input being connected to said winding, a first source of unidirectional current pulses, means controlled by current pulses produced by said first source for reversing the magnetization of said core from one direction to the opposite direction, a second source of unidirectional current pulses, and means controlled by a current pulse produced by said second source for reversing the magnetization of said core from said opposite direction to said one direction, whereby a voltage of said sign is produced in said winding in response to a change in the magnetization of said core from said opposite direction to said one direction.

54. In an electronic circuit, the combination which comprises: a core composed of a material having appreciable magnetic retentivity, said core having a winding thereon, circuit means having an input and an output and including unilaterally operating conductive means adapted to produce current of predetermined polarity at said output in response to the application of a voltage of predetermined sign applied to said input, a first magnetizing means including a first source of unidirectional current, means for operating and restoring said first magnetizing means, said core being magnetized in one direction by operation of said first magnetizing means, second magnetizing means including a second source of unidirectional current, and means for operating and restoring said second magnetizing means, said core being magnetized in the opposite direction upon operation of said second magnetizing means, whereby voltage of said sign is produced in said winding in response to a change in the magnetization of said core from said one direction to said opposite direction.

55. In an electronic circuit, the combination which comprises: a core composed of a material having appreciable magnetic retentivity, said core having a winding thereon, circuit means having an input and an output and including unilaterally operating conducting means adapted to produce current of predetermined polarity at said output in response to the application of a voltage of predetermined sign applied to said input, said input being connected to said winding, a first source of unidirectional current pulses, means controlled by current pulses produced by said first source for reversing the magnetization of said core from one direction to the opposite direction, a second source of unidirectional current pulses, and means controlled by a current pulse produced by said second source for reversing the magnetization of said core from said opposite direction to said one direction, whereby a voltage of said sign is produced in said winding in response to a change in the magnetization of said core from said opposite direction to said one direction.

56. In an electronic circuit, the combination which comprises: a core composed of a material having appreciable magnetic retentivity, said core having a primary winding, a secondary winding, and an auxiliary winding wound thereon, circuit means having an input and an output and adapted to produce current of predetermined polarity at its output in response to application of a voltage of predetermined sign applied to its input, said input being connected to said secondary winding, a first source of direct current, first control means adapted when operated to apply current from said first source to said auxiliary winding to produce a magnetizing force in one direction in said core, means for operating and restoring said first control means, a second source of direct current, second control means adapted when operated to apply current from said second source to said primary winding to produce a magnetizing force in the opposite direction in said core whereby a voltage of said sign is produced in said secondary winding in response to a change in the magnetization of said core from said one direction to said opposite direction, and means for operating and restoring said second control means.

57. A magnetic system comprising a plurality of magnetic cores; a first, second, and third electrical winding on each of said cores; electrical circuit connections between the second winding on one of said cores and the third winding on another of said cores; said connections including means for transmitting an electrical signal from said second winding to said third winding only when the flux direction within the core of said second winding changes from a predetermined flux direction to the other flux direction in response to an actuating signal applied to said first windings; said transmitted signal causing magnetic flux within the core of said third winding to be oriented in said predetermined flux direction; said connections further including means for providing a time delay between said actuating signal and said transmitted signal, and means for preventing the transmission of electrical signals from said third windings to said second windings.

58. A magnetic system comprising a plurality of magnetic cores; a first, second, and third electrical winding on each of said cores; said first windings being connected to simultaneously receive electrical actuating signals, a plurality of delay circuits each connected between the second winding on one of said cores and third winding on another of said cores; and unidirectional impedance means connected with each of said delay circuits and its associated second and third windings to allow voltages of only one predetermined polarity induced in the associated secondary winding to produce signal current in the associated third winding, and to prevent voltages induced in the associated third winding from producing signal current in the associated second winding.

59. A magnetic system comprising a plurality of magnetic cores having essentially rectangular hysteresis characteristics; an actuation winding, an input winding, and an output winding on each of said cores; said actuation windings being connected to receive simultaneously actuating electrical pulse signals which cause the residual flux within said cores to reside in an arbitrarily defined negative direction; a plurality of delay circuits each connecting the output winding of one of said cores to the input winding to another of said cores; and unidirectional impedance means connected with each of said delay circuits for allowing only positive changes in flux within the core of an input winding to result from flux changes within the core of the output winding connected to that input winding, and for preventing flux changes within the core of the input winding from producing flux changes within the core of the output winding; said input and output windings and said impedance means being poled to cause said positive changes in flux within the core of an input winding to result from negative flux changes within the core of the output winding connected to that input winding.

60. A magnetic scaling system comprising a plurality of magnetic cores having relatively high magnetic retentivity; a first, second, and third winding on each of said cores; said first windings being connected to simultaneously receive actuating electrical pulses which cause orientation of the residual magnetism within said cores in a predetermined flux direction; electrical connections between the second winding of each core and the third winding of a different core, connecting said second and third windings in closed cascade relation through said cores; each of said connections including a delay circuit, and unidirectional impedance means for permitting only current pulses causing orientation of the residual magnetism of any one of said cores in a flux direction opposite said predetermined direction to flow in the third winding of said one core in response to voltages induced in the second winding connected to that third winding as a result of residual flux changes from said opposite flux direction to said predetermined direction in the core of said connected second winding caused by said actuating pulses and to prevent electrical signal transfer from any of said third windings to any of said second windings.

61. A magnetic shifting register comprising at least two magnetic cores; an actuation winding, and an output winding on each of said cores; said actuation windings being for connection to receive simultaneously actuating electrical pulse signals which cause the residual magnetism within said cores to have a predetermined flux direction; at least one delay circuit and one unidirectional impedance connecting the output winding of a first of said cores to the input winding of a second of said cores; said connected output and input windings and said unidirectional impedance being connected with polarities to allow only signal current causing orientation of the residual magnetism of said second core to have a direction opposite said predetermined flux direction to be transferred from said connected output winding in response to voltage induced in said connected output winding by a residual magnetism flux direction change resulting from said actuating signals; and said connected input winding having fewer turns than said connected output winding to provide an impedance mismatch therebetween which prevents effective current transfer from said connected input winding to said connected output winding due to voltages induced in said connected input winding.

62. A magnetic shifting register comprising a plurality of magnetic cores having generally rectangular hysteresis characteristics; a first, second, and third electrical winding on each of said cores; said first windings being connected to receive simultaneously actuating voltage pulses which cause residual magnetism in said cores in a predetermined flux direction; a plurality of delay circuits each connected between the output winding on a given one of said cores and the input winding on the core succeeding said one core in the shifting sequence; and unidirectional impedance means in series with said delay circuits for allowing electrical current transfer from said second windings to said third windings to cause residual magnetism in a direction opposite said predetermined flux direction in the cores of said third windings only in response to a magnetic flux direction change in the cores of the said second windings from said opposite to said predetermined flux direction caused by said actuating voltage pulses, and to prevent current transfer from said third windings to said second windings; whereby the residual magnetism flux direction of any one of said cores is shifted to the succeeding core in response to tone of said actuating pulses.

63. A magnetic system comprising a plurality of magnetic cores, electrical windings on each of said cores, electrical circuit connections between one winding on one of said cores and a corresponding winding on another of said cores, said connections including means for transmitting an electrical signal from said one winding to said corresponding winding only when the flux direction within the core of said one winding changes in a predetermined direction, means for changing the flux direction within the core of said one winding, and means for introducing a time delay between the actuation of said last-named means and said transmitted signal.

64. A magnetic system comprising a plurality of magnetic cores, electrical windings on each of said cores, corresponding windings thereof being connected simultaneously to receive electrical actuating signals; delay circuits connected between the windings of adjacent cores, and unidirectional impedance means connected to each of said delay circuits to allow voltages of only one predetermined polarity induced in the winding of one core to produce signal current in the winding of the succeeding core, and to prevent voltages induced in the winding of the said succeeding core from producing signal current in the associated winding of the preceding core.

65. A magnetic shifting register comprising at least two magnetic cores, an input winding and output winding on each of said cores, means to apply simultaneously actuating electrical pulse signals to said cores to cause the residual magnetism within said cores to have a predetermined flux direction, at least one delay circuit and one unidirectional impedance connecting the output winding of a first of said cores to the input winding of a second of said cores, said connected output and input windings and said unidirectional impedance being connected with polarities to allow only signal current causing orientation of the residual magnetism of said second core to have a direction opposite said predetermined flux direction to be transferred from said connected output winding in response to voltage induced in said connected output winding by a residual magnetism flux direction change resulting from said actuating signals, said connected input winding having fewer turns than said connected output winding to provide an impedance mismatch therebetween, thereby to prevent effective current transfer from said connected input winding to said connected output winding due to voltages induced in said connected input winding.

66. A magnetic shifting register comprising a plurality of magnetic cores having generally rectangular hysteresis characteristics, input and output electrical windings on each of said cores, means to simultaneously establish residual magnetism in said cores in a predetermined flux direction, a plurality of delay circuits each connected between the output winding on a given one of said cores and the input winding on the core succeeding said one core in the shifting sequence, and unidirectional impedance means in series with said delay circuits for allowing electrical current transfer from said output windings to said input windings to cause residual magnetism in a direction opposite said predetermined flux direction in the cores of said input windings only in response to a magnetic flux direction change in the cores of the said output windings from said opposite to said predetermined flux direction, and to prevent energy transfer from said input windings to said output windings, whereby the residual magnetism flux direction of any one of said cores is shifted to the succeeding core.

67. In a binary magnetic system, the combination comprising a first magnetic circuit adapted to be maintained in a predetermined one of a pair of stable states of magnetization, means for shifting the magnetization of said first circuit to the other of said states, a second magnetic circuit also adapted to be maintained in a predetermined one of a pair of stable states of magnetization, said second circuit being selectively responsive to alterations of the magnetization of said first circuit to effect alterations of the magnetization of said second circuit, and means to delay the response to said second circuit to alterations in magnetization of said first circuit.

68. In a binary magnetic system, the combination comprising a first magnetic circuit adapted to be maintained in a predetermined one of a pair of stable states of magnetization, means for shifting the magnetization of said first circuit to the other of said states, a second magnetic circuit also adapted to be maintained in a predetermined one of a pair of stable states of magnetization said second circuit being selectively responsive to alterations of the magnetization of said first circuit to effect alterations of the magnetization of said second circuit, means to delay the response of said second circuit to alterations in magnetization of said first circuit and means effectively decoupling said first and second circuits for magnetic influences originating in said second circuit and directed toward said first circuit.

69. In a magnetic scaler, the combination comprising a first magnetic circuit magnetized in a predetermined sense, means for altering the magnetization of said first circuit, a second magnetized circuit adapted to be maintained in a predetermined state of magnetization and coupled to said first circuit, said second circuit being selectively responsive to alterations of the magnetization of said first circuit to alter the magnetization of said second circuit, means in the coupling between said first and second circuits to delay the response of said second circuit to alterations in magnetization of said first circuit, and means effectively decoupling said first and second circuits for magnetic influences originating in said second circuit and directed toward said first circuit.

70. A magnetic system comprising a plurality of magnetic cores; a first, second and third electrical winding on each of said cores; electrical circuit connections between the second winding on one of said cores and the third winding on another of said cores; said connections including means for transmitting an electrical signal from said second winding to said third winding only when the flux direction within the core of said second winding changes from a predetermined flux direction to the other flux direction in response to an actuating signal applied to said first windings; said transmitted signal causing magnetic flux within the core of said third winding to be oriented in said predetermined flux direction; said connections further including means for preventing the transmission of electrical signals from said third windings to said second windings.

71. A magnetic system comprising a plurality of magnetic cores; a first, second, and third electrical winding on each of said cores; said first windings being connected to simultaneously receive electrical actuating signals; a plurality of circuits each connected between the second winding on one of said cores and the third winding on another of said cores; and unidirectional impedance means connected in each of said circuits and its associated second and third windings to allow voltages of only one predetermined polarity induced in the associated secondary winding to produce signal current in the associated third winding, and to prevent voltages induced in the associated third winding from producing signal current in the associated second winding.

72. A magnetic system comprising a plurality of magnetic cores having essentially rectangular hysteresis characteristics; an actuation winding, an input winding, and an output winding on each of said cores; said actuation windings being connected to receive simultaneously actuating electrical pulse signals which cause the residual flux within said cores to reside in an arbitrarily defined negative direction; a plurality of circuits each connecting the output winding of one of said cores to the input winding to another of said cores; and unidirectional impedance means connected with each of said circuits for allowing only positive changes in flux within the core of an input winding to result from flux changes within the core of the output winding connected to that input winding, and for preventing flux changes within the core of the input winding from producing flux changes within the core of the output winding; said input and output windings and said impedance means being poled to cause said positive changes in flux within the core of an input winding to result from negative flux changes within the core of the output winding connected to that input winding.

73. A magnetic scaling system comprising a plurality of magnetic cores having relatively high magnetic retentivity; a first, second, and third winding on each of said cores; said first windings being connected to simultaneously receive actuating electrical pulses which cause orientation of the residual magnetism within said cores in a predetermined flux direction; electrical connections between the second winding of each core and the third winding of a different core, connecting said second and third windings in closed cascade relation through said cores; each of said connections including unidirectional impedance means for permitting only current pulses causing orientation of the residual magnetism of any one of said cores in a flux direction opposite said predetermined direction to flow in the third winding of said one core in response to voltages induced in the second winding connected to that third winding as a result of residual flux changes from said opposite flux direction to said predetermined direction in the core of said connected second winding caused by said actuating pulses and to prevent electrical signal transfer from any of said third windings to any of said second windings.

74. A magnetic scaling system comprising a plurality of magnetic cores having generally rectangular hysteresis characteristics; an input winding, an output winding, and an actuation winding on each of said cores; said actuation winding being connected to receive simultaneously actuating voltage pulses to be scaled; means connecting each of said input windings to the output windings of a different one of said cores from the core of that input winding, said input and output windings thereby being connected in closed cascade relation through said cores; each of said connecting means including a first unidirectional impedance in series with said input windings, and a second unidirectional impedance in shunt relation with said first impedance and said input winding.

75. A magnetic shifting register comprising at least two magnetic cores; an actuation winding, and an output winding on each of said cores; said actuation windings being for connection to receive simultaneously actuating electrical pulse signals which cause the residual magnetism within said cores to have a predetermined flux direction; at least one unidirectional impedance connecting the output winding of a first of said cores to the input winding of a second of said cores: said connected output and input windings and said unidirectional impedance being connected with polarities to allow only current causing orientation of the residual magnetism of said second core to have a direction opposite said predetermined flux direction to be transferred from said connected output winding in response to voltage induced in said connected output winding by a residual magnetism flux direction change resulting from said actuating signals; and said connected input winding having fewer turns than said connected output winding to provide an impedance mismatch therebetween which prevents effective current transfer from said connected input winding to said connected output winding due to voltages induced in said connected input winding.

76. A magnetic shifting register comprising a plurality of magnetic cores having generally rectangular hysteresis characteristics; a first, second, and third electrical winding on each of said cores; said first windings being connected to receive simultaneously actuating voltage pulses which cause residual magnetism in said cores in a predetermined flux direction; a plurality of circuits each connected between the output winding on a given one of said cores and the input winding of the core succeeding said one core in the shifting sequence; and unidirectional impedance means in series with said circuits for allowing electrical current transfer from said second windings to said third windings to cause residual magnetism in a direction opposite said predetermined flux direction in the cores of said third windings only in response to a magnetic flux direction change in the cores of the said second windings from said opposite to said predetermined flux direction caused by said actuating voltage pulses, and to prevent current transfer from said third windings to said second windings; whereby the residual magnetism flux direction of any one of said cores is shifted to the succeeding core in response to one of said actuating pulses.

77. A magnetic system comprising a plurality of magnetic cores, electrical windings on each of said cores, electrical connections between one winding on one of said cores and a corresponding winding on another of said cores, said connections including means for transmitting an electrical signal from said one winding to said corresponding winding only when the flux direction within the core of said one winding changes in a predetermined direction, and means for changing the flux direction within the core of said one winding.

78. A magnetic system comprising a plurality of magnetic cores, electrical windings on each of said cores, corresponding windings thereof being connected simultaneously to receive electrical actuating signals; circuits connected between the windings of adjacent cores, and unidirectional impedance means connected to each of said circuits to allow voltages of only one predetermined polarity induced in the winding of one core to produce signal current in the winding of the succeeding core, and to prevent voltages induced in the winding of the said succeeding core from producing signal current in the associated winding of the preceding core.

79. A magnetic scaling system comprising a plurality of magnetic cores having generally rectangular hysteresis characteristics, an input winding and an output winding on each of said cores, means for applying simultaneous actuating electrical voltage pulses to be scaled, means connecting each of said input windings to the output windings of a different one of said cores from the core of that input winding, said input and output windings thereby being connected in closed cascade relation through said cores, each of said connecting means including first unidirectional impedance in series with said input windings and a second unidirectional impedance in shunt relation with said first impedance and said input winding.

80. A magnetic shifting register comprising at least two magnetic cores, an input winding and an output winding on each of said cores, means to apply simultaneously actuating electrical pulse signals to said cores to cause the residual magnetism within said cores to have a predetermined flux direction, at least one unidirectional impedance connecting the output winding of a first of said cores to the input winding of a second of said cores, said connected output and input windings and said unidirectional impedance being connected with polarities to allow only signal current causing orientation of the residual magnetism of said second core to have a direction opposite said predetermined flux direction to be transferred from said connected output winding in response to voltage induced in said connected output winding by a residual magnetism flux direction change resulting from said actuating signals, said connected input winding having fewer turns than said connected output winding to provide an impedance mismatch therebetween, thereby to prevent effective current transfer from said connected input winding to said connected output winding due to voltages induced in said connected input winding.

81. A magnetic shifting register comprising a plurality of magnetic cores having generally rectangular hysteresis characteristics, input and output electrical windings on each of said cores, means to simultaneously establish residual magnetism in said cores in a predetermined flux direction, a plurality of circuits each connected between the output winding on a given one of said cores and the input winding on the core succeeding said one core in the shifting sequence, and unidirectional impedance means in said circuits for allowing electrical current transfer from said output windings to said input windings to cause residual magnetism in a direction opposite said predetermined flux direction in the cores of said input windings only in response to a magnetic flux direction change in the cores of the said output windings from said opposite to said predetermined flux direction, and to prevent energy transfer from said input windings to said output windings, whereby the residual magnetism flux direction of any one of said cores is shifted to the succeeding core.

82. In a binary magnetic system, the combination comprising a first magnetic circuit adapted to be maintained in a predetermined one of a pair of stable states of magnetization, means for shifting the magnetization of said first circuit to the other of said states, and a second magnetic circuit also adapted to be maintained in a predetermined one of a pair of stable states of magnetization, said second circuit being selectively responsive to alterations of the magnetization of said first circuit to effect alterations of the magnetization of said second circuit.

83. In a binary magnetic system, the combination comprising a first magnetic circuit adapted to be maintained in a predetermined one of a pair of stable states of magnetization, means for shifting the magnetization of said first circuit to the other of said states, a second magnetic circuit also adapted to be maintained in a predetermined one of a pair of stable states of magnetization said second circuit being selectively responsive to alterations of the magnetization of said first circuit to effect alterations of the magnetization of said second circuit, and means effectively decoupling said first and second circuits for magnetic influences originating in said second circuit and directed toward said first circuit.

84. In a magnetic scaler, the combination comprising a first magnetic circuit magnetized in a predetermined sense, means for altering the magnetization of said first circuit, a second magnetized circuit adapted to be maintained in a predetermined state of magnetization and coupled to said first circuit, said second circuit being selectively responsive to alterations of the magnetization of said first circuit to alter the magnetization of said second circuit, and means effectively decoupling said first and second circuits for magnetic influences originating in said second circuit and directed toward said first circuit.

85. An information delay line including at least two cores of magnetic material in which the residual magnetic flux density is a large fraction of the saturation flux density, winding means on said cores, rectifying means connecting said winding means on one of said cores with said winding means on another of said cores, and pulse generator means operatively connected to said winding means.

86. A pulse transfer controlling device, including a core of magnetic material having an appreciable retentivity, an input winding on said core, an output winding on said core, a control winding on said core, and pulse generator means connected to said control winding whereby said core may be set in a desired state of residual magnetic flux density.

87. In a pulse handling device comprising two cores of magnetic material in which the residual magnetic flux density is a large fraction of the saturation flux density; first, second, and third windings on said first core; first, second, and third windings on said second core; rectifying means interconnecting said third winding on said first core and said first winding on said second core; and pulse generating means operatively connected to the second windings on said two cores.

88. A pulse handling device comprising at least two cores of magnetic material in which the residual magnetic flux density is a large fraction of the saturation flux density; first, second and third windings on said first core; first, second and third windings on said second core; and unilaterally operating rectifying means interconnecting said third winding on said first core and said first winding on said second core; and pulse generating means operatively connected to the second windings on said two cores.

89. A pulse transfer controlling device including a core of magnetic material having an appreciable retentivity, winding means on said core, and current pulse generator means operatively connected to said winding means to apply an input current pulse to said winding means to induce in said winding means an output voltage controlled by the state of residual magnetic flux density of said core.

90. A pulse transfer controlling device including a core of magnetic material in which the residual magnetic flux density is a large fraction of the saturation flux density, and a plurality of windings on said core, one of said windings having rectifying means connected thereto, a load connected to said rectifier in which current flow will take place in but a single direction, and pulse generator means connected to another of said windings.

91. In an electric circuit, the combination which comprises: relay means having an operated condition and a restored condition and including a control circuit; a core composed of a material having appreciable magnetic retentivity; a coil in said control circuit and linked by flux in said core; said control circuit operating said relay means upon induction of a potential in said coil only in response to a relatively large flux change in one direction occurring in said core; means for applying magnetizing forces to said core in one sense and in the opposite sense whereby a relatively large flux change occurs only when said core is subjected to a magnetizing force in the opposite sense and has previously been subjected to a magnetizing force in said one sense.

92. In an electric circuit; an element composed of a material having appreciable magnetic retentivity, input and output winding means linked with flux in said element; means for energizing said input winding means to magnetize said element in one direction and for energizing said input winding means to magnetize said element in the opposite direction; and means operatively connected to said output winding means and operable between a first stable condition and a second stable condition in response to a voltage induced in said output winding means by a flux change in said element.

93. In an electric circuit; an element composed of a material having appreciable magnetic retentivity, winding means linked with flux in said element; means for energizing said winding means to magnetize said element in one direction and for energizing said winding means to magnetize said element in the opposite direction; and means operatively connected to said winding means and operable between a first stable condition and a second stable condition in response to a voltage induced in said winding means by a flux change in said element.

94. Magnetic memory apparatus comprising: first and second magnetic binary storage cores, means including a winding on said first core for storing a baud in said first core, and means including a pulse generator and windings on said first and second cores for transferring the baud from the first to the second core.

95. In a binary magnetic system the combination comprising a first bistable magnetic circuit adapted to be maintained in a predetermined one of a pair of different stable states of residual magnetization; means for shifting said first circuit to the other of said stable states of residual magnetization; and a second bistable circuit also adapted to be maintained in a predetermined one of a pair of stable states; said second circuit being responsive to flux changes produced by alterations of the stable state of said first circuit to affect alterations of the stable state of said second circuit.

96. A pulse transfer controlling device, including a core of magnetic material having appreciable retentivity; input winding means on said core, output winding means on said core, and means connected to said input winding means for energizing said input winding means to set said core in a desired state of residual flux density and for inducing in said output winding means a voltage controlled by the state of residual magnetic flux density of said core, and a load coupled to said output winding means and controlled thereby.

97. An information storing system comprising: a plurality of elements of magnetic material each having a plurality of residual magnetic states; means for selectively altering the residual magnetic states of said elements to thereby register information in said elements; and output winding means linking said elements and responsive to flux changes therein for recalling information registered in said elements.

98. An information storing system comprising; a plurality of elements of magnetic material each having a plurality of residual magnetic states; input means for selectively altering the residual magnetic states of said elements to thereby register information in said elements; said input means including windings on said elements connected in series circuit relationship with a pulse generator; and output winding means linking said elements and responsive to flux changes therein for recalling information registered in said elements.

99. An information storing system comprising: a plurality of elements of magnetic material having plural residual states; means for selectively altering the residual magnetic states of said elements to thereby register and receive information; and means for selectively sensing a change from one of said residual magnetic states to another of said residual magnetic states by one of said elements to manifest the registered content of said one element.

100. An information storing device comprising; means for maintaining a plurality of different magnetic flux states; means for selectively changing said magnetic flux states to thereby register information; detecting means for detecting a change in said magnetic flux states to thereby form a signal to manifest registered information; and means for selectively passing signals from said detecting means in accordance with the manner of change of said magnetic flux states.

101. An information storing device comprising: a closed flux circuit formed of uniform material capable of supporting different stable flux conditions to thereby represent different information; means for changing the flux in said circuit from one stable condition to another stable condition to thereby register information; and an electrical output conductor magnetically linked to said closed flux circuit whereby changes in the flux in said circuit from one stable condition to another stable condition induce a signal in said electrical conductor indicative of registered information, and a load coupled to said electrical output conductor and controllable by a signal induced therein.

102. A memory element of the type which has a residual flux density which is a large fraction of its saturation flux density and which is provided with primary winding means which are energizable to cause the core to assume either a first or a second information representing stable state of residual flux density, and a secondary winding on said element, separate from said primary winding means, said secondary winding linking said element for producing an induced output voltage indicative of the particular stable state of the element in response to the flux change produced in the element upon application of a predetermined magnetizing force to said element.

103. A pulse transfer controlling device including a core of magnetic material having a plurality of residual magnetic states, an input winding on said core, an output winding on said core, a control winding on said core, and a pulse generator means connected to said control winding, whereby said core may be set in a desired state of residual magnetic flux density.

104. An information storing device comprising an element formed of magnetic material having a plurality of distinct residual magnetic states, means for altering the residual magnetic state of said magnetic element by driving said element to magnetic saturation and an electrical output conductor magnetically coupled to said magnetic element whereby upon a change in the residual magnetic state of said magnetic element a signal is induced in said electrical conductor to thereby manifest information registered by said magnetic element.

105. An information storing device comprising an element formed of soft magnetic material having appreciable magnetic retentivity, means for altering the residual magnetic state of said magnetic element by driving said element to magnetic saturation and an electrical output conductor magnetically coupled to said magnetic element whereby upon a change in the residual magnetic state of said magnetic element a signal is induced in said electrical conductor to thereby manifest information registered by said magnetic element.

106. An information storing device comprising a closed flux circuit capable of supporting different stable flux conditions to thereby represent different information, means for changing the flux in said circuit from one stable condition to another stable condition to thereby register information and an electrical output conductor magnetically linked to said closed flux circuit whereby changes in the flux in said circuit from one stable condition to another stable condition induce a signal in said electrical conductor indicative of registered information.

107. An information storing device comprising a closed flux circuit formed of uniform material capable of supporting different stable flux conditions to thereby represent different information, means for changing the flux in said circuit from one stable condition to another stable condition to thereby register information and an electrical output conductor magnetically linked to said closed flux circuit whereby changes in the flux in said circuit from one stable condition to another stable condition induce a signal in said electrical conductor indicative of registered information.

No references cited.

UNITED STATES PATENT OFFICE
CERTIFICATION OF CORRECTION

Patent No. 2,970,291 January 31, 1961

Frederick W. Viehe

It is hereby certified that error appears in the above numbered patent requiring correction and that the said Letters Patent should read as corrected below.

Column 18, line 41, strike out "a", first occurrence, column 20, line 24, for "cotary" read -- rotary --; line 25, for "aross" read -- across --; column 21, line 10, for "close" read -- chosen --; column 22, line 53, for "and ground serves to prevent shock to the volt-" read -- of the first pentode $P_5$ of the pulse standardizer --; column 27, line 69, for "stage" read -- stages --; column 29, line 19, for "anole" read -- anode --; line 26, for "conductng" read -- conducting --; same column 29, line 55, for "aperating" read -- operating --; column 42, lines 2 and 3, strike out "of transformers being connected to the control electrodes --; column 44, line 40, for "where" read -- whereby --.

Signed and sealed this 19th day of September 1961.

(SEAL)
Attest:

ERNEST W. SWIDER
Attesting Officer

DAVID L. LADD
Commissioner of Patents